(12) United States Patent
Akselrod et al.

(10) Patent No.: US 12,392,967 B2
(45) Date of Patent: Aug. 19, 2025

(54) MULTICOATED TUNABLE OPTICAL DEVICES

(71) Applicant: Lumotive, Inc., Redmond, WA (US)

(72) Inventors: Gleb M. Akselrod, Kenmore, WA (US); Lie "Larry" Zhao, Washougal, WA (US); Erik Edward Josberger, Renton, WA (US); Prasad Padmanabha Iyer, Albuquerque, NM (US)

(73) Assignee: Lumotive, Inc., Redmond, WA (US)

( * ) Notice: Subject to any disclaimer, the term of this patent is extended or adjusted under 35 U.S.C. 154(b) by 394 days.

(21) Appl. No.: 18/305,572

(22) Filed: Apr. 24, 2023

(65) Prior Publication Data
US 2024/0353624 A1    Oct. 24, 2024

(51) Int. Cl.
| G02B 6/293 | (2006.01) |
| G02B 1/115 | (2015.01) |
| G02B 26/00 | (2006.01) |

(52) U.S. Cl.
CPC .......... *G02B 6/29395* (2013.01); *G02B 1/115* (2013.01); *G02B 26/001* (2013.01)

(58) Field of Classification Search
CPC ... G02B 6/29395; G02B 1/115; G02B 26/001
USPC .......................................................... 359/237
See application file for complete search history.

(56) References Cited

U.S. PATENT DOCUMENTS

| 10,451,800 | B2 | 10/2019 | Akselrod et al. |
| 10,665,953 | B1 | 5/2020 | Akselrod et al. |
| 10,915,002 | B2 | 2/2021 | Akselrod |
| 10,968,522 | B2 | 4/2021 | Akselrod et al. |
| 11,037,973 | B2 | 6/2021 | Akselrod |
| 11,092,675 | B2 | 8/2021 | Akselrod et al. |
| 11,429,008 | B1 | 8/2022 | Akselrod et al. |
| 11,914,266 | B1 | 2/2024 | Akselrod |
| 2012/0194399 | A1 | 8/2012 | Bily et al. |
| 2014/0266946 | A1 | 9/2014 | Bily et al. |
| 2015/0162658 | A1 | 6/2015 | Bowers et al. |

(Continued)

FOREIGN PATENT DOCUMENTS

WO    2018156793 A1    8/2018

OTHER PUBLICATIONS

U.S. Appl. No. 18/329,526, Non-Final Office Action mailed Sep. 26, 2023, 10 pp.

*Primary Examiner* — William Choi
(74) *Attorney, Agent, or Firm* — PCFB, LLC; Justin K. Flanagan

(57) ABSTRACT

A device may include a dielectric substrate layer with an array of multicoated elongated metal rails extending from the dielectric substrate parallel to one another and spaced from one another to form channels therebetween. The dimensions of the multicoated elongated metal rails and the channels therebetween may be subwavelength with respect to an operational bandwidth. In some examples, each multicoated elongated metal rail is formed with a copper core coated with an optically reflective silver coating followed by a passivation coating. In various examples, a conductive barrier material separates each multicoated elongated metal rail from an underlying dielectric substrate layer. A tunable dielectric material that has a tunable refractive index, such as liquid crystal, is positioned within the channels between adjacent multicoated elongated metal rails.

31 Claims, 25 Drawing Sheets

(56) References Cited

U.S. PATENT DOCUMENTS

| | | |
|---|---|---|
| 2015/0318618 A1 | 11/2015 | Chen et al. |
| 2015/0318620 A1 | 11/2015 | Black et al. |
| 2015/0372389 A1 | 12/2015 | Chen et al. |
| 2015/0380828 A1 | 12/2015 | Black et al. |
| 2018/0202928 A1* | 7/2018 | Abdulhalim ....... G01N 21/7743 |
| 2018/0239021 A1 | 8/2018 | Akselrod et al. |
| 2018/0239213 A1 | 8/2018 | Akselrod et al. |
| 2018/0241131 A1 | 8/2018 | Akselrod et al. |
| 2018/0248267 A1 | 8/2018 | Akselrod et al. |
| 2018/0351093 A1 | 12/2018 | Wu |
| 2019/0285798 A1 | 9/2019 | Akselrod et al. |
| 2019/0301025 A1 | 10/2019 | Akselrod et al. |

* cited by examiner

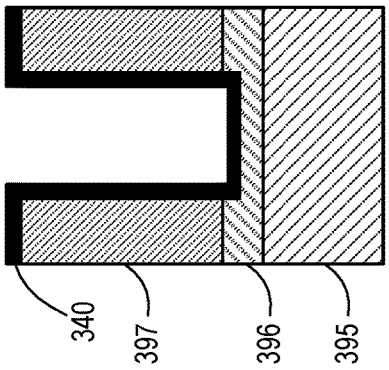
FIG. 3C
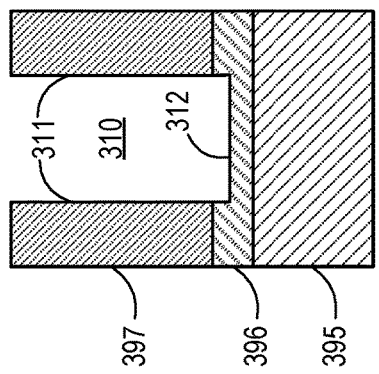
FIG. 3B
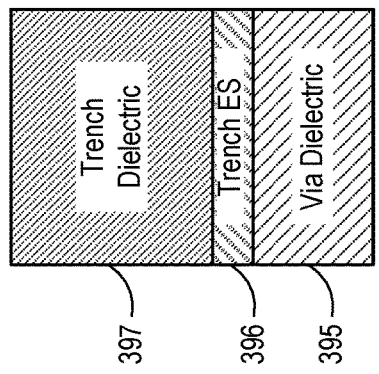
FIG. 3A
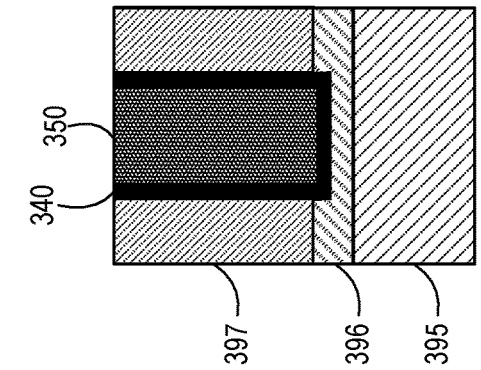
FIG. 3F
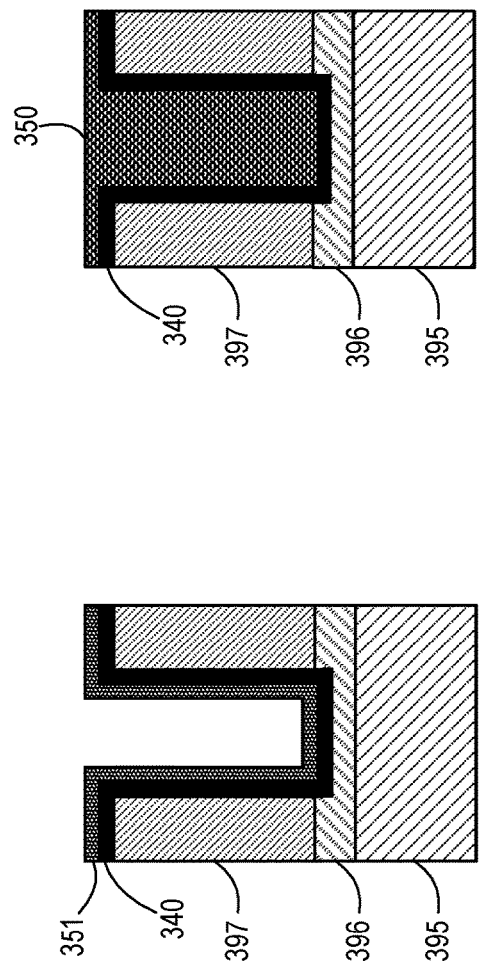
FIG. 3E
FIG. 3D

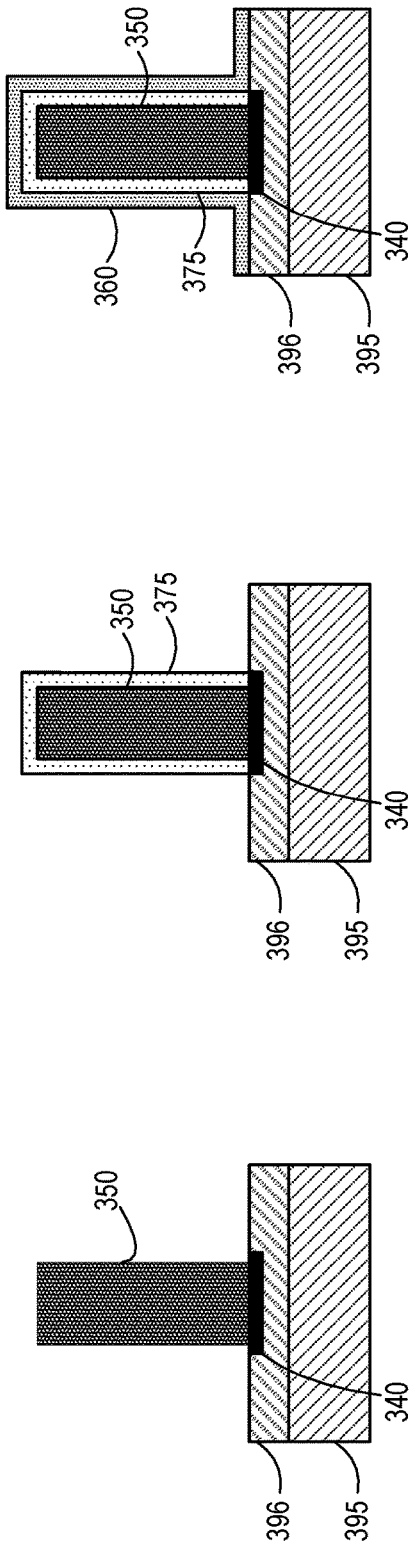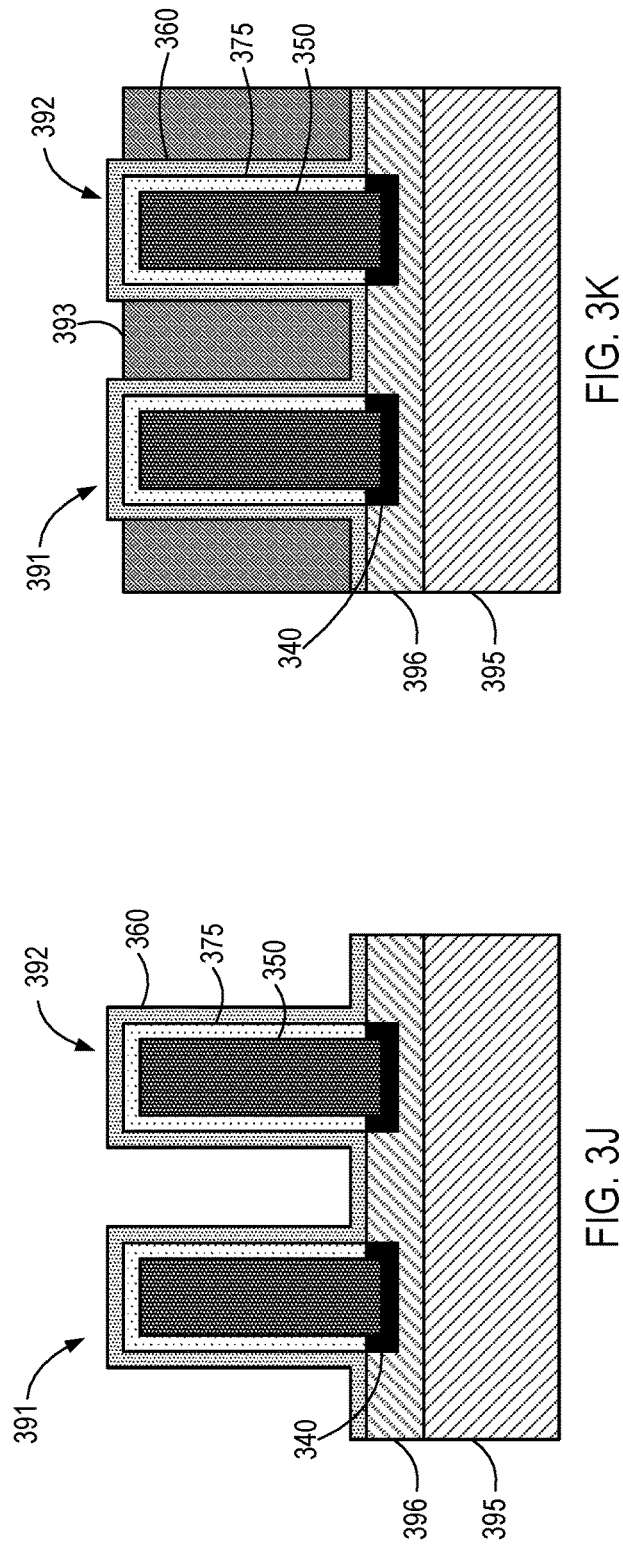

MULTICOATED TUNABLE OPTICAL DEVICES

TECHNICAL FIELD

This disclosure relates to optical metasurfaces, reflectors, deflectors, and antenna elements, including tunable optical metasurfaces.

BRIEF DESCRIPTION OF THE DRAWINGS

FIGS. 3A-3K illustrate example diagrams of a manufacturing process for a metasurface with multicoated metal rails with an optically reflective metal coating on the sidewalls and the top wall, according to one embodiment.

DETAILED DESCRIPTION

Figure 1A:
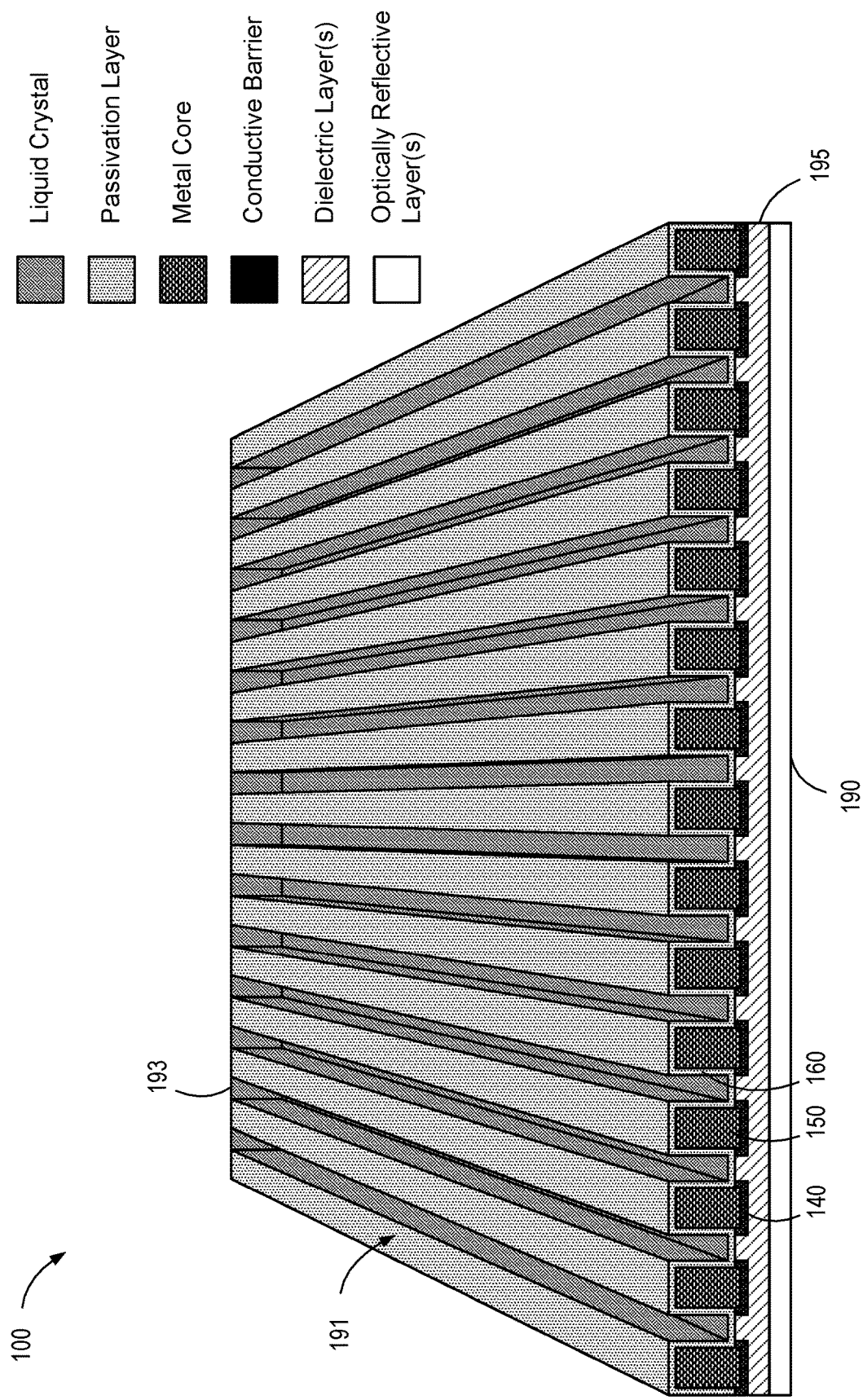
FIG. 1A illustrates an example diagram of a tunable metasurface, according to one embodiment.

Tunable optical metasurfaces may be used for beamforming, including three-dimensional beam shaping, two-dimensional beam steering, and/or one-dimensional beam steering. The presently described systems and methods can be applied to tunable metasurfaces utilizing various architectures and designs to deflect optical radiation within an operational bandwidth. In various embodiments, a controller or metasurface driver selectively applies a pattern of voltages to an array of optical structures. Voltage differentials across adjacent optical structures modify the refractive indices of dielectric material therebetween. A combination of phase delays created by the pattern of applied voltages creates constructive interference in the desired beam steering direction.

Various examples of tunable optical metasurfaces are described herein and depicted in the figures. For example, a tunable optical metasurface includes an array of metal elements (e.g., antenna elements, resonator elements, elongated resonator rails, metal pillar pairs, etc.). For instance, in some embodiments, the array of metal elements comprises a one-dimensional array of elongated metal resonator rails arranged parallel to one another with respect to an optical reflector, such as an optically reflective layer of metal or a Bragg reflector. Liquid crystal, or another refractive index tunable dielectric material, is positioned in the gaps or channels between adjacent resonator rails. Liquid crystal is used in many of the examples provided in this disclosure. However, it is appreciated that alternative dielectric materials with tunable refractive indices and/or combinations of different dielectric materials with tunable refractive indices may be utilized instead of liquid crystal in many instances. Examples of suitable tunable dielectric materials that have tunable refractive indices include liquid crystals, electro-optic polymer, chalcogenide glasses, and/or various semiconductor materials.

According to various embodiments in which the multicoated metal elements are embodied as elongated multicoated metal rails, the liquid crystal or other tunable dielectric material may be deposited within channels defined by adjacent pairs of multicoated elongated metal rails to at least partially fill each channel, to completely fill each channel to the height of a passivation coating, fill each channel to a height of a conductive metal core of each multicoated elongated metal rail, fill each channel to a height of the optically reflective metal coating on the sidewalls and/or top wall of each multicoated elongated metal rail, and/or overfill the channels such that a layer of liquid crystal or other tunable dielectric material is positioned above the array of multicoated elongated metal rails. While outside the scope of this disclosure, the liquid crystal or other tunable dielectric material may be sealed within the channels by an optically transparent cover (e.g., a glass, sapphire, or transparent dielectric cover), as described in greater detail in the disclosures incorporated by reference herein.

In various embodiments, biasing the liquid crystal in a metasurface with a pattern of voltage biases changes the reflection phase of the optical radiation. For example, each different voltage pattern applied across the metasurface corresponds to a different reflection phase pattern. Each different reflection phase pattern of a one-dimensional array of optical structures (e.g., elongated metal resonator rails) corresponds to a different steering angle in a single dimension. A digital or analog controller (controlling current and/or voltage), such as a metasurface driver, may apply a differential voltage bias pattern to achieve a target beam shaping, such as a target beam steering angle. The term "beam shaping" is used herein in a broad sense to encompass one-dimensional beam steering, two-dimensional beam steering, wavelength filtering, beam divergence, beam convergence, beam focusing, and/or controlled deflection, refraction, and/or reflection of incident optical radiation.

Some examples of the systems and methods described herein include a tunable optical device with an array of multicoated elongated metal rails extending from a dielectric substrate. The multicoated elongated metal rails may be arranged parallel to one another and spaced from one another to form channels therebetween. The widths of the multicoated elongated metal rails may be subwavelength, such that the width is less than a wavelength within the operational bandwidth of the tunable optical device. Similarly, the channel widths between adjacent multicoated elongated metal rails may also be subwavelength. According to various embodiments, each multicoated elongated metal rail includes a metal core that can be defined as having a base wall, substantially parallel sidewalls, and a top wall. The metal core is "multicoated" in that at least one wall is coated with an optically reflective metal coating, and at least one wall is coated with a passivation coating. In some embodiments, one or both of the optically reflective metal coating and the passivation coating may be applied or otherwise deposited within a vacuum or within an inert gas system, such that the coatings are applied before oxidation, or other corrosion, affects the exposed metal core and/or optically reflective metal coating.

Various examples and arrangements of coatings are described herein, along with example manufacturing approaches. The metal core of each elongated metal rail is illustrated and described in many instances as being copper or as including copper (e.g., a copper alloy). Devices with copper metal cores may, for example, be fabricated using modified damascene processes for semiconductor devices. However, it is appreciated that other metals may also be utilized, including but not limited to tungsten, aluminum, copper alloys, and/or combinations thereof.

One or more walls of the metal core of each elongated metal rail may be coated with the coatings described herein. In some examples, additional coatings may also be utilized for adhesion, additional reflectivity, increased corrosion resistance, decreased dopant, alloy leaching, etc. For example, the optically reflective metal coating may comprise a highly reflective silver layer applied to a copper metal core. In some instances, the optically reflective metal coating may include a thin adhesion layer of cobalt applied to the copper metal core, followed by a highly reflective outer layer of silver.

In some examples, the optically reflective metal coating is deposited on both the top wall and the sidewalls of the metal core of each multicoated elongated metal rail. The passivation coating or layer may also be deposited over the top wall and sidewalls of the metal core of each multicoated elongated metal rail (e.g., on top of the optically reflective metal coating. In other examples, the optically reflective metal coating is deposited on only the top wall of the metal core of each respective multicoated elongated metal rail.

In still other examples, the optically reflective metal coating is deposited on only the sidewalls of the metal core of each respective multicoated elongated metal rail. In still other examples, the optically reflective metal coating is deposited on only the bottom wall of the metal core of each respective multicoated elongated metal rail. In still other examples, the optically reflective metal coating is deposited on one sidewall of the metal core of each multicoated elongated metal rail but not on the other, opposing sidewall. Variations of the examples described above are possible in which the optically reflective metal coating is only partially deposited on some walls or unintentionally deposited on some walls during the coating process of a wall selected for intentional coating.

In various examples, a conductive barrier material is positioned between the base wall of the metal core of each elongated metal rail and the underlying dielectric substrate. The conductive barrier material may be, for example, tantalum (Ta), tantalum nitride (TaN), titanium nitride (TIN), and/or a combination thereof. Alternative conductive barrier metals, metallic materials, and/or doped semiconductor materials may be used in place of or in addition to Ta-based conductive barrier materials.

In some examples, the optically reflective metal coating is deposited on the top wall, the sidewalls, and the base wall of the metal core of each multicoated elongated metal rail. In some such embodiments, each multicoated elongated metal rail is separated from the dielectric substrate by the optically reflective metal coating and the conductive barrier material. In other embodiments, the conductive barrier material may be the same metal used for the optically reflective metal coating.

A tunable dielectric material that has a tunable refractive index (e.g., liquid crystal, as described above) is positioned within the channels between adjacent multicoated elongated metal rails. As described above, the tunable dielectric material deposited within the channels between adjacent multicoated elongated metal rails may include liquid crystal, an electro-optic polymer, a chalcogenide glass, and/or a tunable semiconductor material.

The passivation coating may be deposited on the tunable optical device as a single or uniform layer that covers the sidewalls and top wall of each elongated metal rail and the base or lower surface of each channel. The passivation coating may be, for example, a thin silicon nitride (SiN) layer to passivate the metal core when deposited directly on the metal core (as described as optional in some embodiments) and to passivate an optically reflective metal coating previously deposited on one or more walls of the metal core, as described herein. The passivation coating may be optically transparent for wavelengths within the operational bandwidth of the metasurface and/or reflective to complement the optically reflective metal layer (e.g., silver) and/or the underlying reflective conductive metal core (e.g., copper). The passivation layer may alternatively, silicon carbide nitride, silicon carbide, aluminum oxide ($AlO_x$), hafnium oxide ($HfO_2$, silicon oxide ($SiO_2$), aluminum nitride (AlN), boron nitride (BN), and/or another passivating dielectric material.

In various implementations, the optically reflective metal coating may include one or more layers of optically reflective metals, metal alloys, or other optically reflective materials for a given operational bandwidth. In many embodiments, the optically reflective metal coating includes a silver (Ag) metal layer. In some such embodiments, the optically reflective silver coating may have a thickness between 1 and 50 nanometers. In other embodiments, the optically reflective silver coating may have a thickness less than 1 nanometer. In some specific embodiments, the thickness of the optically reflective metal coating may be selected to be between 2 and 6 nanometers.

In some instances, the thickness of the optically reflective metal coating may be different on the sidewalls than it is on the top wall or the bottom wall. As another example, the optically reflective silver coating may have a thickness between 10 and 30 nanometers on one or more of the walls. In various embodiments, the optically reflective metal coating may comprise a single layer of silver (Ag), gold (Au), cobalt (Co), or ruthenium (Ru). In other embodiments, the optically reflective metal coating may comprise multiple layers of one or more of silver, gold, cobalt, and ruthenium. In still other embodiments, the optically reflective metal coating may comprise one or more layers of one or more of silver, gold, cobalt, ruthenium, and/or combinations or alloys thereof.

The various tunable metasurface devices described herein can be manufactured using various semiconductor manufacturing processes including, but not limited to, damascene processes, deposition processes, etching processes, lithography processes, patterning processes, chemical mechanical planarization processes, and the like. One example manufacturing process includes etching a dielectric layer to form an array of parallel elongated trenches in the dielectric layer. Each elongated trench may have substantially vertical sidewalls separated by a base wall that has a width less than a wavelength in an operational bandwidth of the tunable metasurface. A conductive barrier material may be deposited to cover at least the base wall of each elongated trench. In some instances, the conductive barrier material may be deposited to cover the base wall of each elongated trench along with the sidewalls and other exposed surfaces between adjacent trenches.

Each elongated trench may be filled with a conductive metal, such as copper. In some embodiments, a seed layer of copper may be deposited first, and then the remainder (e.g., the remaining volume) of each trench may be filled with copper. The material between the elongated trenches (e.g., dielectric material and/or previously deposited conductive barrier material) is removed via, for example, chemical etching to expose the conductive metal as an array of parallel elongated metal rails with channels therebetween. Each elongated metal rail includes exposed sidewalls, an exposed top wall, and a base wall separated from the dielectric layer by a region of the conductive barrier material.

One or more walls of the now-exposed elongated metal rails may be multicoated with a first coating and a second coating. The first coating may be applied to the exposed sidewalls and/or the exposed top wall of the elongated metal rails. The first coating may include an optically reflective metal coating, such as silver or another of the metals described above. The second coating may be applied over the first coating and/or to any remaining exposed walls of the elongated metal rails. The second coating may be a passivation coating to passivate the exposed metal core (e.g., the copper core) and/or the optically reflective metal coating previously applied to the metal core of each elongated rail. The channels between adjacent multicoated elongated metal rails are filled with a tunable dielectric material that has a tunable refractive index, such as liquid crystal or another of the tunable dielectrics described herein.

In some instances, removing material between the elongated trenches to expose the conductive metal as the array of parallel elongated metal rails may include planarizing the deposited materials via chemical mechanical planarization (CMP) to remove the deposited conductive barrier material and conductive metal between adjacent elongated trenches filled with the conductive metal. After the chemical mechanical planarization, wet etching may be used to remove the dielectric layer(s) and/or conductive barrier material(s) between the elongated trenches to expose the array of parallel elongated metal rails (e.g., the copper metal rails).

In some embodiments, the dielectric layer that is etched to form the trenches may include multiple dielectric sublayers, one of which is a dielectric etch-stop sublayer to control a depth to which the parallel elongated trenches are etched into the dielectric layer. In other embodiments, the depth to which the trenches are etched into the dielectric layer is controlled based on the etching solution and/or etching time.

In some embodiments, the optically reflective metal coating is applied after the conductive barrier material but before the trenches are filled with the conductive metal core (e.g., copper), such that the optically reflective metal is deposited on the base wall of each respective elongated trench and along the sidewalls of each elongated trench. The trench is then filled with the conductive metal core. In such embodiments, the conductive metal core is coated by the optically reflective metal on the sidewalls and base wall. The material between the elongated trenches is removed (e.g., chemical mechanical planarization and/or wet etching) to expose the optically reflective metal-coated conductive metal cores as an array of elongated coated metal rails with channels therebetween.

Each elongated coated metal rail (e.g., single-coated metal rail at this stage) is separated from the dielectric layer by a region of the conductive barrier material. The passivation coating is deposited on the elongated coated metal rails (and optically within the channels therebetween) to form an array of multicoated elongated metal rails. In some embodiments, the top wall of the conductive metal core of each elongated metal rail may be coated with the optically reflective metal (e.g., silver) prior to the deposition of the passivation coating, such that the conductive metal core of each elongated metal rail is coated on all four sides (top wall, sidewalls, and bottom wall) by the optically reflective metal and coated on at sidewalls and top wall by the passivation coating. The ends of each multicoated elongated metal rail may be coated with the optically reflective metal and/or the passivation coating as well.

The channels between adjacent multicoated elongated metal rails are filled with a tunable dielectric material that has a tunable refractive index, such as liquid crystal. The liquid crystal may be sealed within the channels, as described in some of the related disclosures incorporated by reference below.

Many of the embodiments described and illustrated herein are described in the context of one-dimensional arrays of multicoated elongated metal rails. In some such embodiments, the width of each multicoated elongated metal rail may be subwavelength (e.g., 100-500 nanometers, depending on the operational bandwidth), while the length of each multicoated elongated metal rail may be on the order of tens or hundreds of microns, centimeters, or even tens of centimeters. However, it is also appreciated that two-dimensional arrays of multicoated elongated metal rails may be utilized. In some embodiments, the length of each multicoated elongated metal rail, according to any of the embodiments described herein, may also have subwavelength dimensions.

For example, a two-dimensionally steerable tunable optical device may include a two-dimensional array of multicoated metal antenna elements (e.g., circular pillars, rectangular pillars, square pillars, etc.) extending from a dielectric substrate. The multicoated metal antenna elements may be spaced from one another by less than a wavelength of an operational bandwidth to form subwavelength gaps between adjacent or neighboring multicoated metal antenna elements. Each multicoated elongated metal antenna element may include a rectangular copper core (or a rectangular core of another conductive metal) having a base wall, substantially parallel sidewalls, and a top wall. An optically reflective silver coating may be deposited on the top wall, the sidewalls, and/or the bottom wall. A passivation layer may be deposited on the sidewalls and the top wall. As in previously described embodiments, a conductive barrier material may separate the base wall of each multicoated elongated metal antenna element from the underlying dielectric substrate. A tunable dielectric material with a tunable refractive index, such as liquid crystal, may be positioned between pairs of multicoated metal antenna elements in one or two directions along the two-dimensional array of multicoated metal antenna elements. Alternatively, the tunable dielectric material may be deposited over the entire surface to fill the gaps between adjacent multicoated metal antenna elements in one specific direction or in both directions along the two-dimensional array of multicoated metal antenna elements.

This disclosure includes various embodiments and variations of tunable optical metasurface devices and methods for manufacturing the same. It is appreciated that the metasurface technologies described herein may incorporate or otherwise leverage prior advancements in surface scattering antennas, such as those described in U.S. Patent Publication Nos. 2012/0194399, 2019/0285798, and 2018/0241131, which publications are hereby incorporated by reference in their entireties. Additional elements, applications, and features of surface scattering antennas are described in U.S. Patent Publication Nos. 2014/0266946, 2015/0318618, 2015/0318620, 2015/0380828, 2015/0162658, and 2015/0372389, each of which is hereby incorporated by reference in its entirety.

In various embodiments, the multicoated elongated metal rails have subwavelength dimensions suitable for operation within a specific bandwidth of optical frequencies (e.g., a bandwidth of infrared optical frequencies). The width of each multicoated elongated metal rail may be, for example, less than the smallest wavelength of the operational bandwidth. Similarly, each multicoated elongated metal rail may extend from the dielectric substrate to a height less than the smallest wavelength of the operational bandwidth. Specific descriptions of optical resonant antenna configurations, feature sizes, and manufacturing techniques are described in U.S. Patent Publication No. 2019/0301025 and U.S. patent application Ser. Nos. 15/900,676, 15/900,683, 15/924,744, and 17/685,621, each of which is also hereby incorporated by reference in its entirety.

Examples of metasurfaces are described herein that can be used for transmitting or receiving. Systems incorporating the metasurfaces described herein may be operated as only a transmitter, as only a receiver, simultaneously as a transmitter and receiver, as a time-multiplexed transmitter/receiver, as a frequency-multiplexed transmitter/receiver, with the first metasurface acting as a transmitter and a second metasurface acting as a receiver, or in another transmit/receive configuration or operation technique. Additionally, the metasurfaces described herein may be used to control, tune, or modify reflection phase patterns. For example, one or more metasurfaces may be used to control (i) the reflection phase, (ii) the reflection amplitude, or (iii) the reflection phase and the reflection/transmission amplitude of a signal. Accordingly, a metasurface may be utilized in any of the embodiments described herein to control the complex phase and/or complex amplitude of reflected optical radiation.

Any of the variously described embodiments herein may be manufactured with dimensions suitable for optical bandwidths for optical sensing systems such as LiDAR, optical communications systems, optical computing systems, and displays. For example, the systems and methods described herein can be configured with metasurfaces that operate in the sub-infrared, mid-infrared, high-infrared, and/or visible-frequency ranges (generally referred to herein as "optical"). Given the feature sizes needed for subwavelength optical antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any aspect of any embodiment described herein may be combined with any other aspect of any other embodiment described herein or in the other disclosures incorporated by reference, including all permutations and combinations thereof, consistent with the understanding of one of skill in the art reading this disclosure in the context of such other disclosures.

To the extent used herein, a computing device, system, subsystem, module, driver, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or another customizable and/or programmable device. The computing device may also include a machine-readable storage device, such as non-volatile memory, static RAM, dynamic RAM, ROM, magnetic memory, optical memory, flash memory, or another transitory or non-transitory machine-readable storage media. Various aspects of some embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once, except as explicitly stated or as contextually understood by one of skill in the art.

FIG. 1A illustrates an example of a diagram of a tunable metasurface 100, according to one embodiment. The tunable metasurface 100 can, for example, be used as part of a solid-state optical transmitter system, receiver system, or transceiver system. As illustrated, the tunable metasurface 100 includes an optical reflector layer 190 and a dielectric layer 195. A plurality of elongated rails 191 are arranged at sub-wavelength intervals on the optical reflector layer 190. The optical reflector layer 190 may be, for example, a layer of copper. The elongated rails 191 may be electrically separated from the optical reflector layer 190 by the dielectric layer 195. The elongated rails 191 may be referred to herein as "resonator rails" because the gaps between adjacent elongated rails 191 are resonant within the optical operational bandwidth of the metasurface.

The elongated rails 191 may be made of metal or have a conductive metal core 150. A passivation layer or passivation coating 160 may be applied to the conductive metal core 150 to passivate the conductive metal core 150. A conductive barrier material 140 may separate a base wall of the metal core of each of the elongated rails 191 from the underlying substrate layers (e.g., the dielectric layer 195).

Liquid crystal or another refractive index tunable dielectric material 193 is positioned between the elongated rails 191. A controller or metasurface driver (not illustrated) may apply voltage differential bias patterns to the elongated rails 191 to modify a reflection phase of the resonators. The combination of phase delays imparted from all the elongated rails 191 can be used to generate constructive interference in a target beam steering direction. In some embodiments, electrical leads or control lines from the controller or metasurface driver may pass through vias or gaps in the optical reflector layer 190, through the dielectric layer 195, and make electrical connections with each respective elongated rail 191 or groups of elongated rails 191 via the conductive barrier material 140.

Figure 1B:
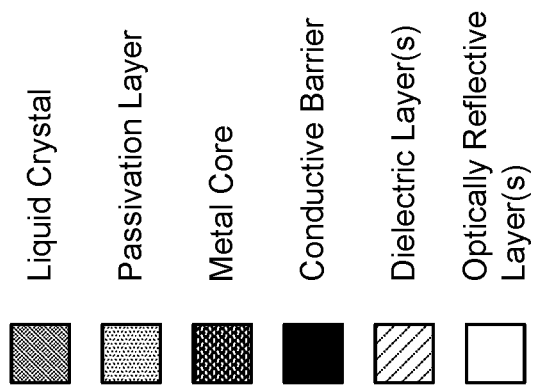
FIG. 1B illustrates an example diagram of liquid crystal positioned between two parallel elongated metal rails of a tunable metasurface, according to one embodiment.
Figure 1B:
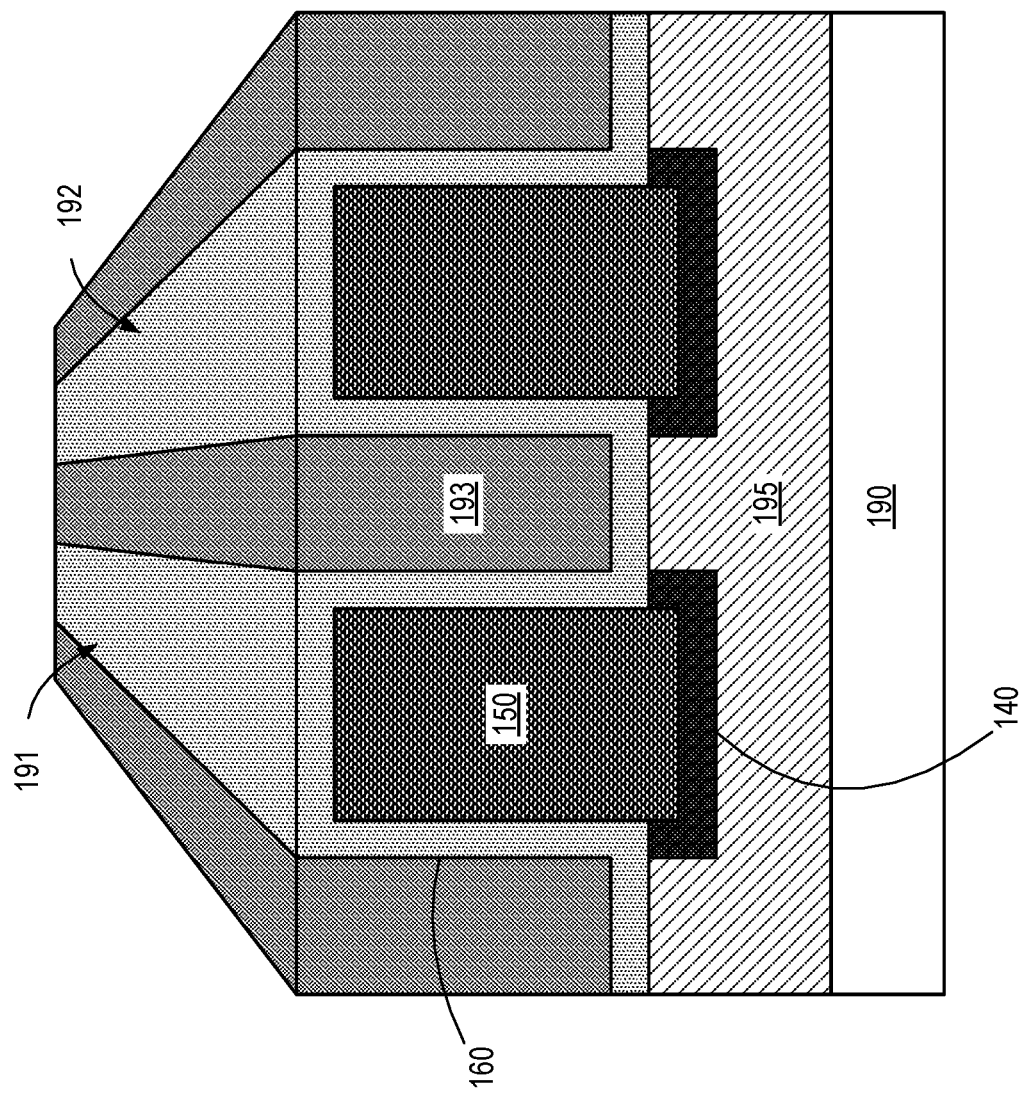

FIG. 1B illustrates an example diagram of the tunable dielectric material 193 (e.g., liquid crystal) positioned between two parallel elongated metal rails 191 and 192, according to one embodiment. As illustrated, the elongated metal rails 191 and 192 extend from the optical reflector layer 190 and are electrically isolated from the optical reflector layer 190 via the dielectric layer 195. The conductive metal core 150 of each metal rail 191 and 192 has a passivation coating 160 applied. The relative dimensions of widths, heights, lengths, and spacing of the elongated metal rails 191 and 192 and the relative thicknesses of the dielectric layer 195 and the optical reflector layer 190 are not necessarily to scale. Given the nanometer-scale of many of the features of the presently described systems and methods, many of the figures, including FIGS. 1A and 1B, include features that are not drawn to scale and are not intended to convey information about the actual or relative dimensions of the various elements.

Additional descriptions, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" and U.S. Pat. No. 11,092,675 granted on Aug. 17, 2021, entitled "Lidar Systems based on Tunable Optical Metasurfaces," each of which is hereby incorporated by reference in its entirety. Many of the metasurfaces described in the above-identified U.S. patents include parallel rails positioned above a two-dimensional or planar reflective surface or layer.

Figure 2A:
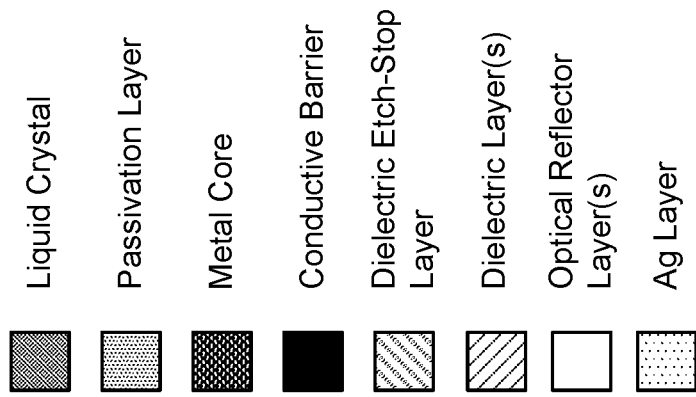
FIG. 2A illustrates an example diagram of two parallel, multicoated elongated metal rails of a tunable metasurface, according to one embodiment.
Figure 2A:
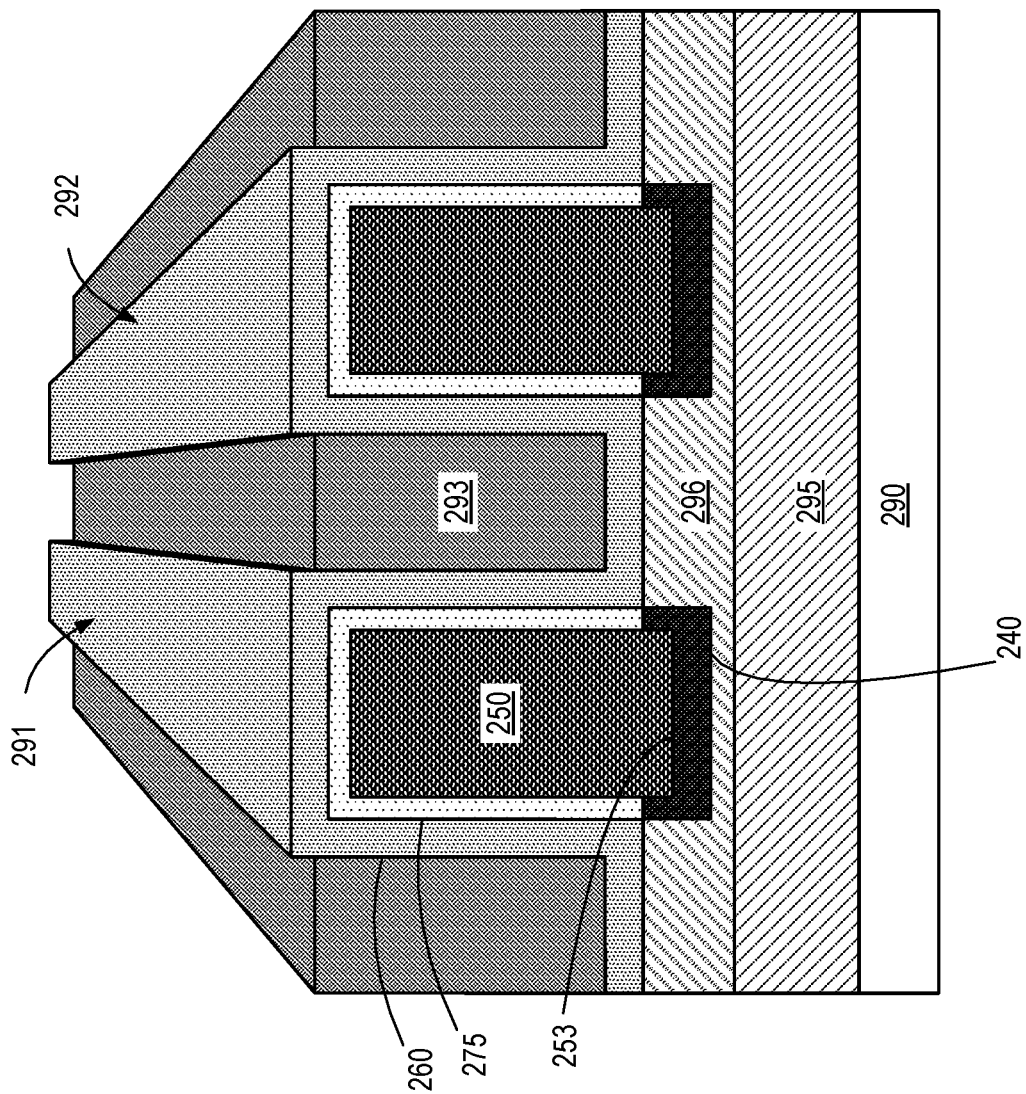

FIG. 2A illustrates an example diagram of two parallel, multicoated elongated metal rails 291 and 292 of a tunable metasurface, according to one embodiment. Liquid crystal 293 is positioned between the multicoated elongated metal rails 291 and 292. In the illustrated embodiment, the multicoated elongated metal rails 291 and 292 extend from an optical reflector layer 290 but are electrically isolated therefrom by a first dielectric layer 295 and a dielectric etch-stop layer 296. A conductive barrier material 240 facilitates through-substrate control line connections (e.g., for applying voltage differentials to the multicoated elongated metal rails 291 and 292). Each multicoated elongated metal rail 291 and 292 includes a conductive metal core 250.

In the illustrated embodiment, an optically reflective metal coating 275 is applied to (e.g., deposited on) the sidewalls and top wall of the metal core 250 of each respective multicoated elongated metal rail 291 and 292. The optically reflective metal coating 275 is referred to as a "first" coating on the conductive metal core 250 of each respective elongated metal rail 291 and 292. A passivation layer or passivation coating 260 constitutes the "second" coating on the conductive metal core 250 of each respective elongated metal rail 291 and 292. In the illustrated embodiment, the optically reflective metal coating 275 is identified as a silver (Ag) layer. In various embodiments, the optically reflective metal coating 275 may comprise a single layer of silver. In other embodiments, the optically reflective metal coating 275 may include a single layer of an alternative metal, such as gold, cobalt, or ruthenium. In still other embodiments, the optically reflective metal coating 275 may include multiple layers or alloys of silver gold, cobalt, and/or ruthenium.

In various embodiments, the dielectric etch-stop layer 296 operates to control the depth to which a trench is etched during a manufacturing process of the metasurface. Additional details regarding the manufacturing process are described in conjunction with other figures below. In the illustrated embodiment, the trench was partially etched into the dielectric etch-stop layer 296, such that the base wall 253 of the metal core 250 is positioned slightly lower than the upper surface of the dielectric etch-stop layer 296.

Figure 2B:
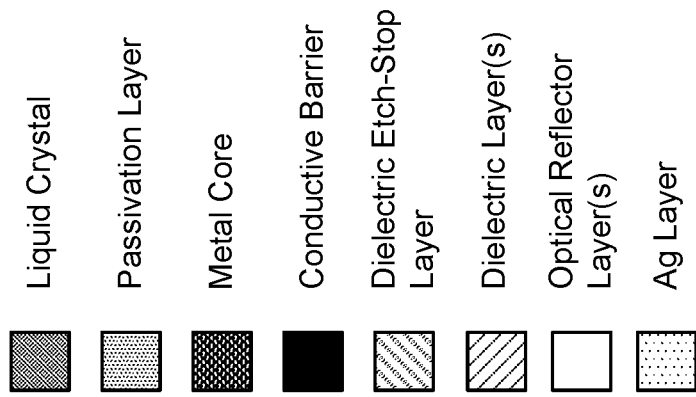
FIG. 2B illustrates another example diagram of two parallel, multicoated elongated metal rails of a tunable metasurface, according to an alternative embodiment.
Figure 2B:
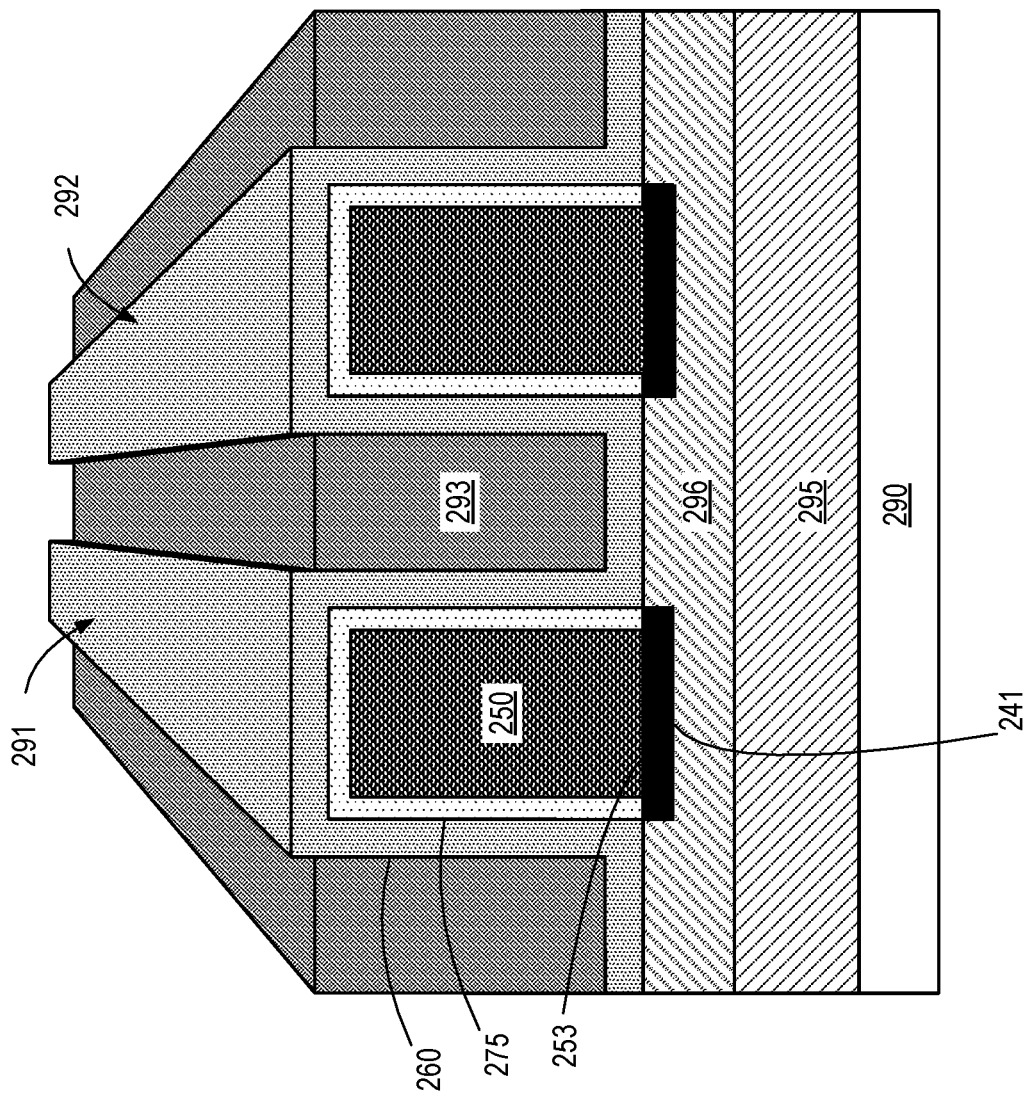

FIG. 2B illustrates another example diagram of two parallel, multicoated elongated metal rails 291 and 292 of a tunable metasurface, according to an alternative embodiment. In the illustrated embodiment, the dielectric etch-stop layer 296 is completely etched to a target depth that accommodates the thickness of the conductive barrier material 241, such that the upper surface of the conductive barrier material 241 of FIG. 2B is co-planar with the upper surface of the dielectric etch-stop layer 296. Likewise, the bottom wall 253 of the conductive metal core 250 is co-planar with the upper surface of the dielectric etch-stop layer 296.

FIG. 2B is provided as a contrast to FIG. 2A and highlights that the conductive barrier material 240 (FIG. 2A) and the conductive metal core 250 may be embedded slightly within the dielectric etch-stop layer 296 or, alternatively, the upper surface of the conductive barrier material 241 (FIG. 2B) may be co-planar with the upper surface of the dielectric etch-stop layer 296. In an alternative embodiment, the dielectric etch-stop layer 296 is unetched during the manufacturing process, and the bottom surface of the conductive barrier material is co-planar with the upper surface of the dielectric etch-stop layer 296 (not shown).

Figure 2C:
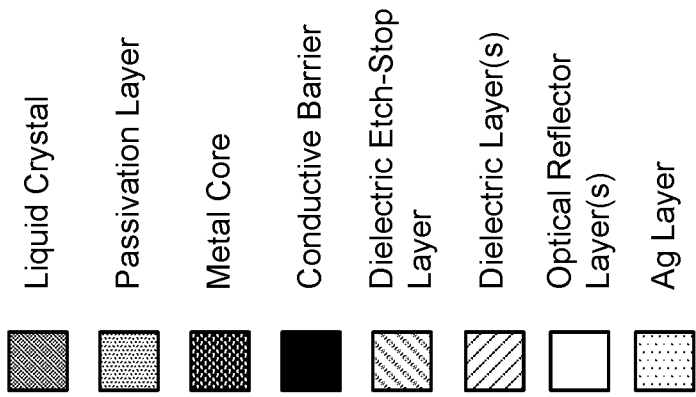
FIG. 2C illustrates another example diagram of two parallel, multicoated elongated metal rails of a tunable metasurface, according to another alternative embodiment.
Figure 2C:
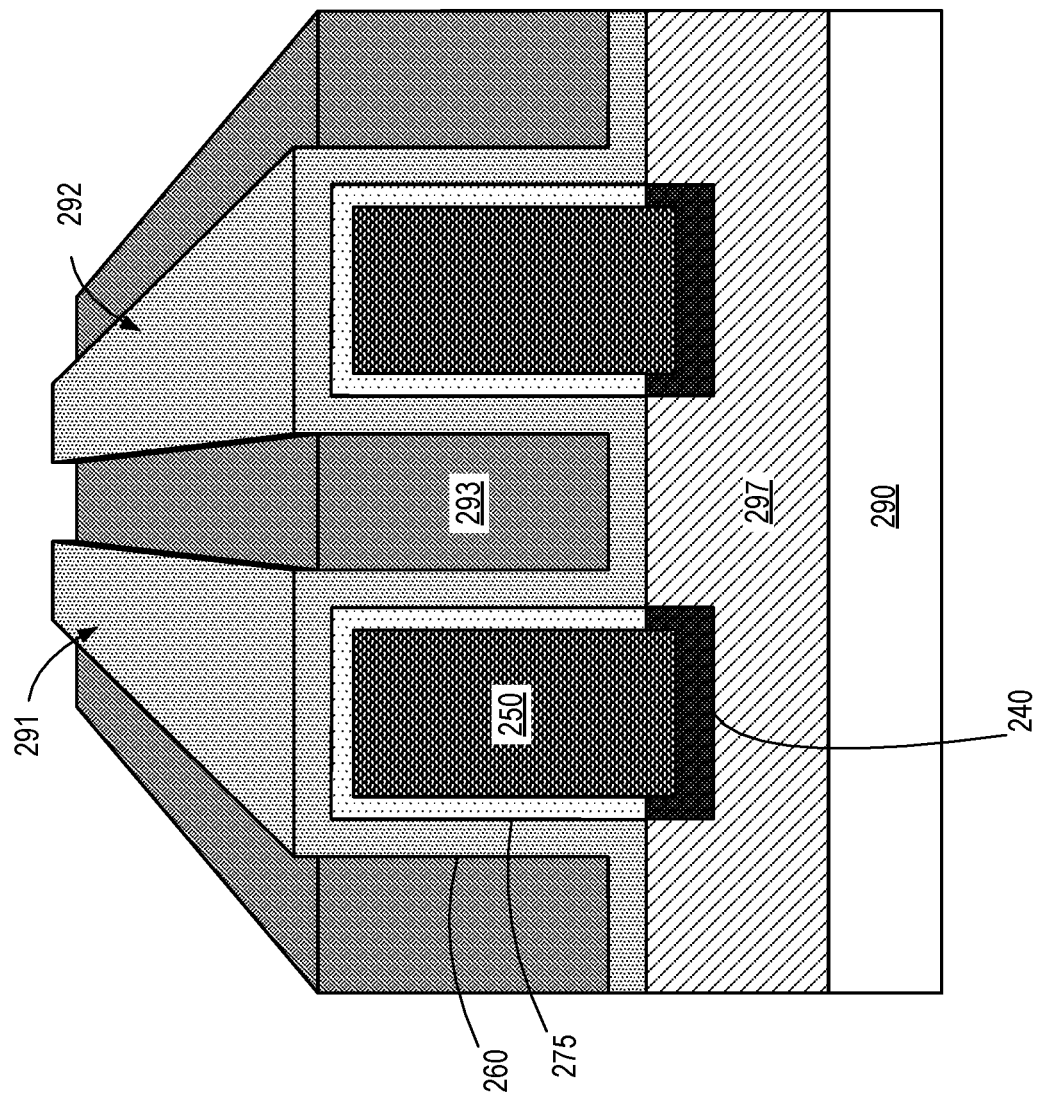

FIG. 2C illustrates another example diagram of two parallel, multicoated elongated metal rails 291 and 292 of a tunable metasurface, according to another alternative embodiment. As illustrated, a single dielectric layer 297 separates the multicoated elongated metal rails 291 and 292 from the optical reflector layer 290. In the illustrated example, the dielectric etch-stop layer 296 of FIGS. 2A and 2B is omitted. In such an embodiment, the depth to which the trenches are etched (as described in greater detail below) may be controlled by the duration of the etching process, the etching solution utilized, and/or the etching process utilized.

Figure 2D:
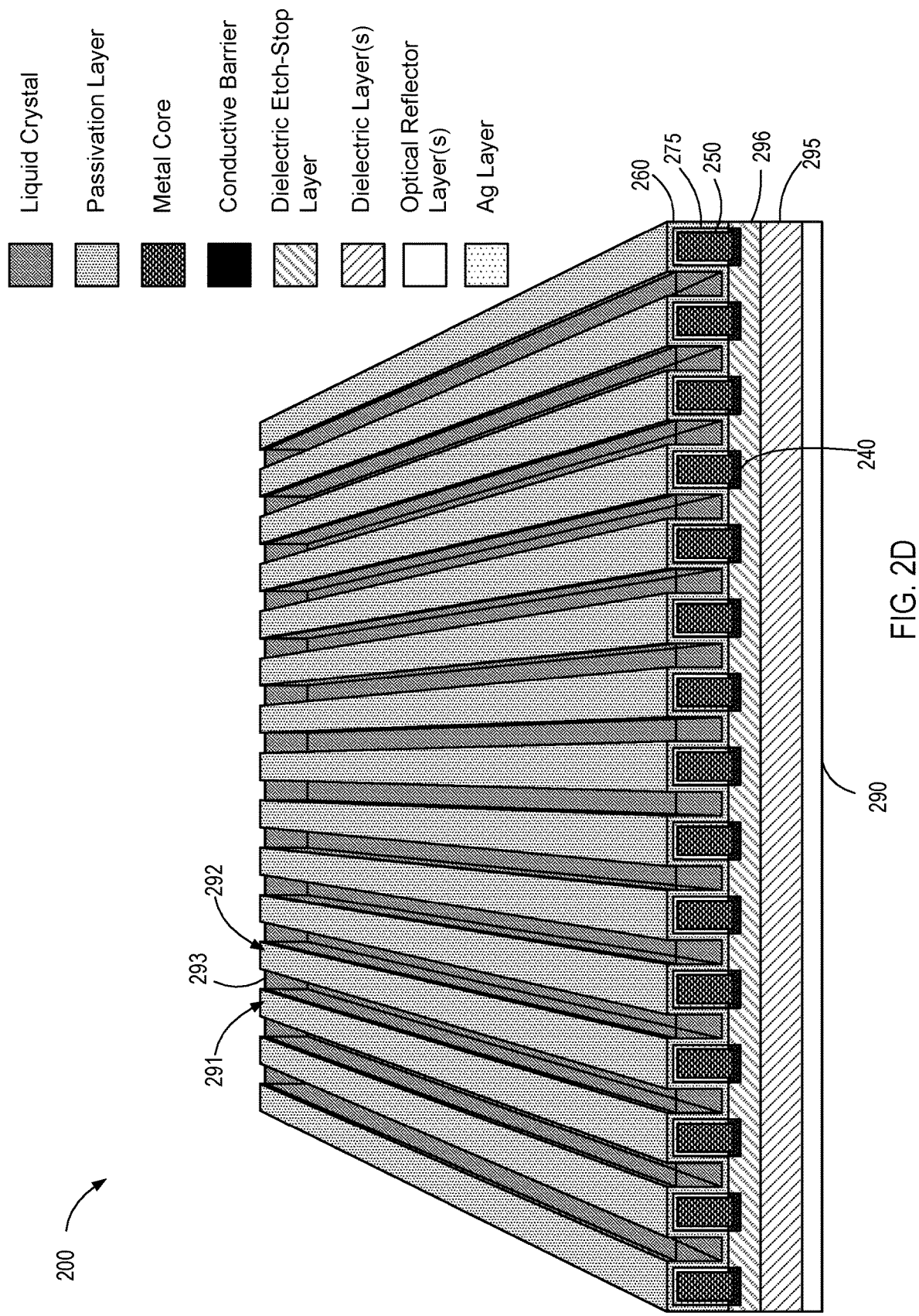
FIG. 2D illustrates an example diagram of a tunable metasurface with multicoated elongated metal rails, according to one embodiment.

FIG. 2D illustrates an example diagram of a tunable metasurface 200 with a one-dimensional array of multicoated elongated metal rails, including multicoated elongated metal rails 291 and 292. The multicoated elongated metal rails, including elongated metal rails 191 and 192, are arranged parallel to one another and extend from the optical reflector layer 290. As previously described in conjunction with FIG. 2A, the one-dimensional array of multicoated elongated metal rails is separated from the optical reflector layer 290 by the dielectric layer 295 and the dielectric etch-stop layer 296. Each multicoated elongated metal rail, including multicoated elongated metal rails 291 and 292, includes a conductive metal core 250 with an optically reflective metal coating 275 (e.g., silver) on each sidewall and on the top wall.

A passivation coating 260 also coats the sidewalls and top wall of each conductive metal core 250 of each respective multicoated elongated metal rail in the array of multicoated elongated metal rails. In the illustrated example, the passivation coating 260 comprises a conformal layer that also coats the lower surface of each channel between each pair of adjacent multicoated elongated metal rails. Liquid crystal 293 is deposited within each channel defined by each pair of adjacent multicoated elongated metal rails.

FIGS. 3A-3K illustrate example diagrams of a manufacturing process for a metasurface with multicoated metal rails with an optically reflective metal coating on the sidewalls and the top wall, according to one embodiment. In many embodiments, an optical reflector layer may be utilized for reflective-type metasurfaces. The optical reflector layer is omitted from the illustrated diagrams, as are other possible underlying layers outside of the scope of this disclosure. A similar configuration without an optical reflector layer may be used for transmissive or transmit-type metasurfaces.

FIG. 3A illustrates a dielectric via layer 395, a dielectric etch-stop layer 396, and a dielectric trench layer 397, which can be collectively referred to as a dielectric substrate. In some embodiments, the dielectric via layer 395, the dielectric etch-stop layer 396, and the dielectric trench layer 397 are the same material and/or even the same deposition layer. In such embodiments, the dielectric etch-stop layer 396 is merely conceptual and/or useful in discussing the depth to which a trench is etched within the dielectric substrate. In other embodiments, the dielectric etch-stop layer 396 is a different material than the dielectric trench layer 397. An etching process may be utilized that is capable of etching the dielectric trench layer 397 but unable to etch (or only slowly etch) the dielectric etch-stop layer 396. In such embodiments, the dielectric etch-stop layer 396 functions to limit or control the depth to which a trench is etched within the dielectric substrate. For example, the dielectric via layer 395 and the dielectric trench layer 397 may comprise silicon (Si). The dielectric etch-stop layer 396 may comprise a silicon oxide layer that is resistive to some etching processes and/or etching solutions. Any of the wide variety of etch-stop layer deposition and etching approaches known in the industry may be utilized to form trenches in the dielectric trench layer 397, including maskless lithography using silicon oxide etch-stop layers induced by laser pulses.

FIG. 3B illustrates a trench 310 etched in the dielectric trench layer 397 that stops at or slightly within the dielectric etch-stop layer 396. A method to manufacture a tunable optical device may include etching the dielectric trench layer 397 to form an array of parallel elongated trenches in a dielectric substrate. Each elongated trench 310 may have substantially vertical sidewalls 311 (as illustrated) separated by a base wall 312 that has a width less than a wavelength within the operational bandwidth of the tunable optical device (e.g., metasurface). In subsequent figures, the sidewalls 311 and base wall 312 of the trench 310 are not labeled to avoid obscuring other aspects of the figures.

Etching the trench 310 may be implemented using any of a wide variety of lithography and etching technologies and approaches. Examples of suitable approaches for etching the trench 310 include but are not limited to nanolithography, photoresist patterning, reactive ion etching (RIE), wet chemical etching, ion beam etching (IBE), reactive ion beam etching (RIBE), ion beam milling (IBM), and the like.

FIG. 3C illustrates a conductive barrier material 340 deposited on the base wall 312 of the trench 310. In the illustrated embodiment, the conductive barrier material 340 is deposited as a conformal layer on the base wall 312 and sidewalls 311 of the trench 310 as well outside of the trench on the upper surfaces of the dielectric trench layer 397. Any of a wide variety of thin-film or layer deposition processes may be utilized to deposit the conductive barrier material 340, including but not limited to atomic layer deposition (ALD), chemical vapor deposition (CVD), electroless deposition (ELD), sputtering, evaporation deposition, and the like. In some embodiments, selective deposition techniques may be utilized to limit the deposition of the conductive barrier material 340 to only cover the base wall 312 of the trench 310. According to various embodiments, the conductive barrier material 340 may be tantalum and/or a tantalum nitride.

FIG. 3D illustrates a conductive metal seed 351 deposition within the trench 310. In various embodiments, the conductive metal seed 351 is copper or a copper alloy. In alternative embodiments, the conductive metal seed 351 may comprise one or more of, or a combination of, copper, aluminum, and tungsten. In some embodiments, the conductive metal seed 351 may be deposited using a chemical vapor deposition process, a sputtering process, or another thin-film deposition process. In some embodiments, selective deposition techniques may be utilized to limit the deposition of the conductive metal seed 351 to only cover the sidewalls 311 and/or base wall 312 of the trench 310.

FIG. 3E illustrates the trench 310 filled with a conductive metal 350 (e.g., copper). According to various embodiments, the trench 310 may be filled with the conductive metal 350 via electrochemical plating (ECP) using the conductive metal seed 351 as the "seed" for the electrochemical plating process.

FIG. 3F illustrates the conductive metal 350 and the conductive barrier material 340 within the trench. The upper surfaces outside of the trench 310 have been removed by, for example, chemical mechanical planarization (CMP). In alternative embodiments, any of a wide variety of chemical or mechanical removal processes may be utilized.

FIG. 3G illustrates the material on either side of the conductive metal 350 removed, including the dielectric trench layer 397 and the conductive barrier material 340 on the sidewalls 311 of the trench 310. As illustrated, with the material between adjacent elongated trenches removed, the conductive metal 350 is exposed. The illustration shows only a single "core" of the conductive metal 350 extending from the dielectric etch-stop layer 396. However, the core of conductive metal 350 is exposed by removing the lateral material between all of the parallel elongated trenches in an array of parallel elongated trenches. Accordingly, an array of parallel elongated metal rails of the conductive metal 350 are exposed with channels there between. Each elongated metal rail of the conductive metal 350 includes opposing sidewalls, a top wall, and a base wall. The base wall of the elongated metal rail of conductive metal 350 is separated from the dielectric etch-stop layer 396 by the remaining region (patch or layer) of the conductive barrier material 340.

FIG. 3H illustrates the elongated metal rail of the conductive metal 350 (which is one of many elongated metal rails in an array of elongated metal rails) with a first coating applied. As illustrated, an optically reflective metal coating 375 is applied to the sidewalls and top wall of the elongated metal rail of conductive metal 350. In various embodiments, the optically reflective metal coating 375 comprises a thin layer of silver. In other embodiments, the optically reflective metal coating 375 comprises one or more layers of one or more of silver, gold, cobalt, and ruthenium. In some embodiments, the optically reflective metal coating 375 may comprise one or more of silver, gold, cobalt, and/or ruthenium alloyed with another metal or metallic material.

The elongated metal rail of the conductive metal 350 is describable as a single-coated elongated metal rail. According to various embodiments, the optically reflective metal coating 375 may be applied using selective atomic layer deposition, chemical vapor deposition, electroless deposition, or another selective deposition technique.

FIG. 3I illustrates a second coating applied to each of the elongated metal rails of the conductive metal 350 in the array of elongated metal rails. The second coating is a passivation coating 360 (or passivation layer) that operates to passivate the optically reflective metal coating 375. The passivation coating 360 may be, for example, a thin film or layer of silicon nitride. The passivation coating 360 may be applied using any of the various deposition techniques described herein. In some embodiments, the passivation coating 360 may be applied as a uniform or conformal layer over the elongated metal rails of the conductive metal 350 and within the channels between adjacent elongated metal rails in the array of elongated metal rails.

FIG. 3J illustrates two adjacent elongated metal rails 391 and 392 formed using the process outlined in FIGS. 3A-3I, or a variation thereof. Each of the elongated metal rails 391 and 392 comprises a core of conductive metal 350 (e.g., copper) that is multicoated with a first optically reflective metal coating 375 (e.g., silver) and a passivation coating 360 (e.g., silicon nitride). The bottom wall of the core of conductive metal 350 is separated from the dielectric etch-stop layer 396 and the underlying dielectric via layer 395 by the conductive barrier material 340 (e.g., a tantalum-based conductive barrier).

FIG. 3K illustrates the channels between the adjacent multicoated elongated metal rails 391 and 392 filled with a tunable dielectric material 393 that has a tunable refractive index. For example, liquid crystal or another of the materials described herein may be positioned within the channels of the array of multicoated elongated metal rails 391 and 392. The index of refraction of the tunable dielectric material 393 may be dynamically modified based on a voltage differential applied to the multicoated elongated metal rails 391 and 392 on either side of each respective channel of each respective pair of multicoated elongated metal rails 391 and 392 in a one-dimensional array on any number of multicoated elongated metal rails.

Figures 4A, 4B, 4C:
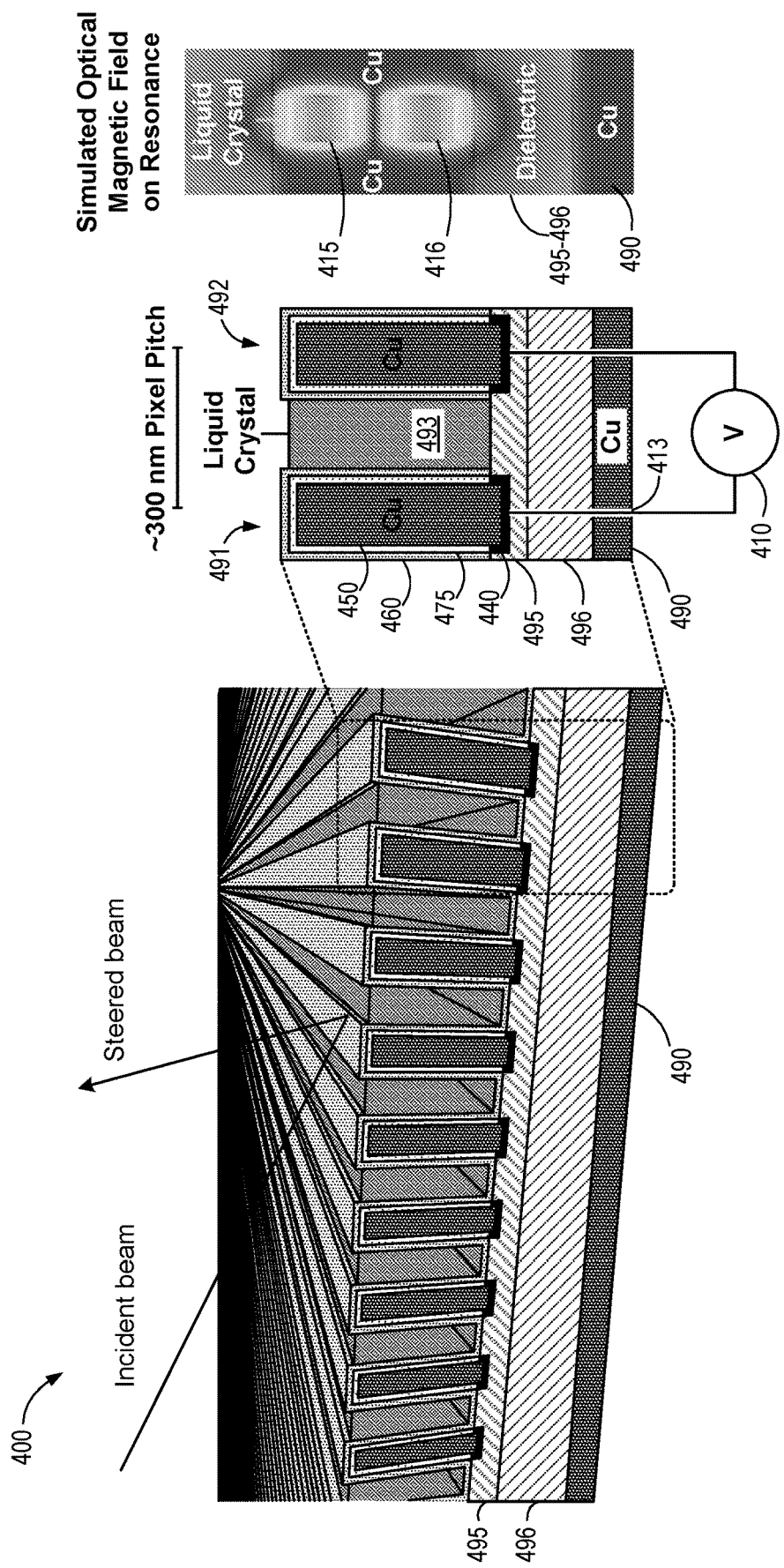
FIG. 4A illustrates a perspective view of multicoated elongated metal rails of a liquid crystal metasurface (LCM) extending from a reflective surface, according to one embodiment.
FIG. 4B illustrates an optically reflective copper substrate, insulating layers, multicoated metal rails spaced to form channels, and liquid crystal deposited within the channels, according to one embodiment.
FIG. 4C illustrates a simulated optical magnetic field of resonance between two adjacent multicoated metal rails, according to one embodiment.

FIG. 4A illustrates a perspective view of multicoated elongated metal rails of a liquid crystal metasurface (LCM) 400 extending from a reflective surface 490, according to one embodiment. The reflective surface 490 and the multicoated elongated metal rails are insulated from one another by a dielectric via layer 496 and a dielectric etch-stop layer 495.

FIG. 4B illustrates the reflective surface 490 as an optically reflective copper substrate, an insulating dielectric via layer 496, and an insulating dielectric etch-stop layer 495. The multicoated elongated metal rails 491 and 492 each extend from a conductive barrier material 440. Liquid crystal 493 is deposited within the channel between the two metal rails 491 and 492. Each of the multicoated elongated metal rails 491 and 492 comprises a conductive metal core 450 made of copper. The copper conductive metal core 450 is multicoated with a first, optically reflective metal coating 475 of silver and a second, passivation coating 460 of silicon nitride.

A voltage controller 410 (such as a metasurface driver) applies a voltage to the two metal rails 491 and 492. Control lines extend from the voltage controller 410 and make an electrical connection with the conductive barrier material 440 after passing through vias 413 in the reflective surface 490, the dielectric layer 496, and the dielectric etch-stop layer 495. In some embodiments, the control lines may be routed around or through gaps in the reflective surface 490 to avoid having to form insulating vias through a conductive reflective surface 490. The reflection phase associated with the liquid crystal 493 is tunable based on the voltage differential between the multicoated elongated metal rails 491 and 492 generated by the voltage controller 410.

FIG. 4C illustrates a simulated optical magnetic field of resonance between two adjacent multicoated metal rails, according to one embodiment. Two resonant nodes 415 and 416 are formed within the optical field region in the channel between the multicoated elongated metal rails 491 and 492.

Figure 4D:
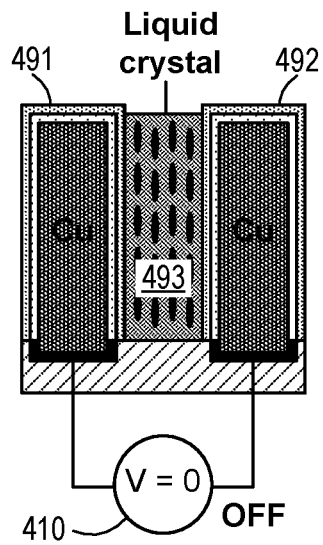
FIG. 4D illustrates liquid crystal between two multicoated metal rails aligned in a first direction to provide a first refractive index without any applied voltage, according to one embodiment.

FIG. 4D illustrates liquid crystal 493 between two multicoated elongated metal rails 491 and 492, according to one embodiment. The liquid crystal 493 is aligned in a first direction to provide a first refractive index without any applied voltage (voltage is 0, at 410).

Figure 4E:
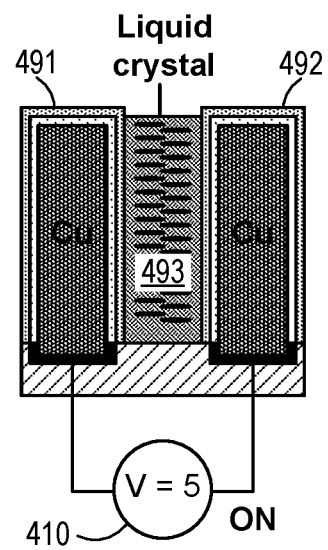
FIG. 4E illustrates the liquid crystal between the two multicoated metal rails aligned in a second direction to provide a second refractive index with an applied voltage of 5 volts, according to one embodiment.

FIG. 4E illustrates the liquid crystal 493 between the multicoated elongated metal rails 491 and 492 aligned in a second direction to provide a second refractive index with an applied voltage of 5 volts (voltage is 5, at 410).

Figure 4F:
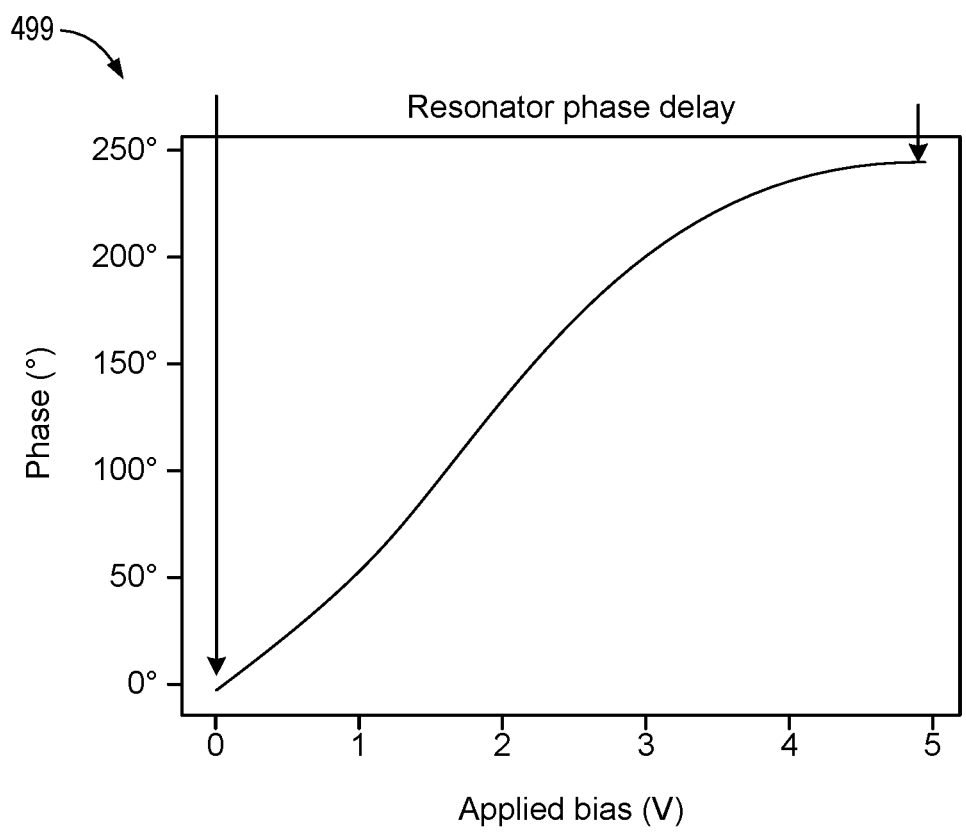
FIG. 4F illustrates a graph of an example phase response of an LCM unit cell with respect to applied voltage values, according to one embodiment.

FIG. 4F illustrates a graph 499 of an example phase response of a metasurface unit cell with respect to applied voltage values, according to one embodiment. As illustrated, various possible phase responses can be obtained by applying a target voltage between 0 and 5 volts. It is appreciated that alternative voltage ranges and/or tunable dielectric materials may be utilized in some applications.

Figure 5A:
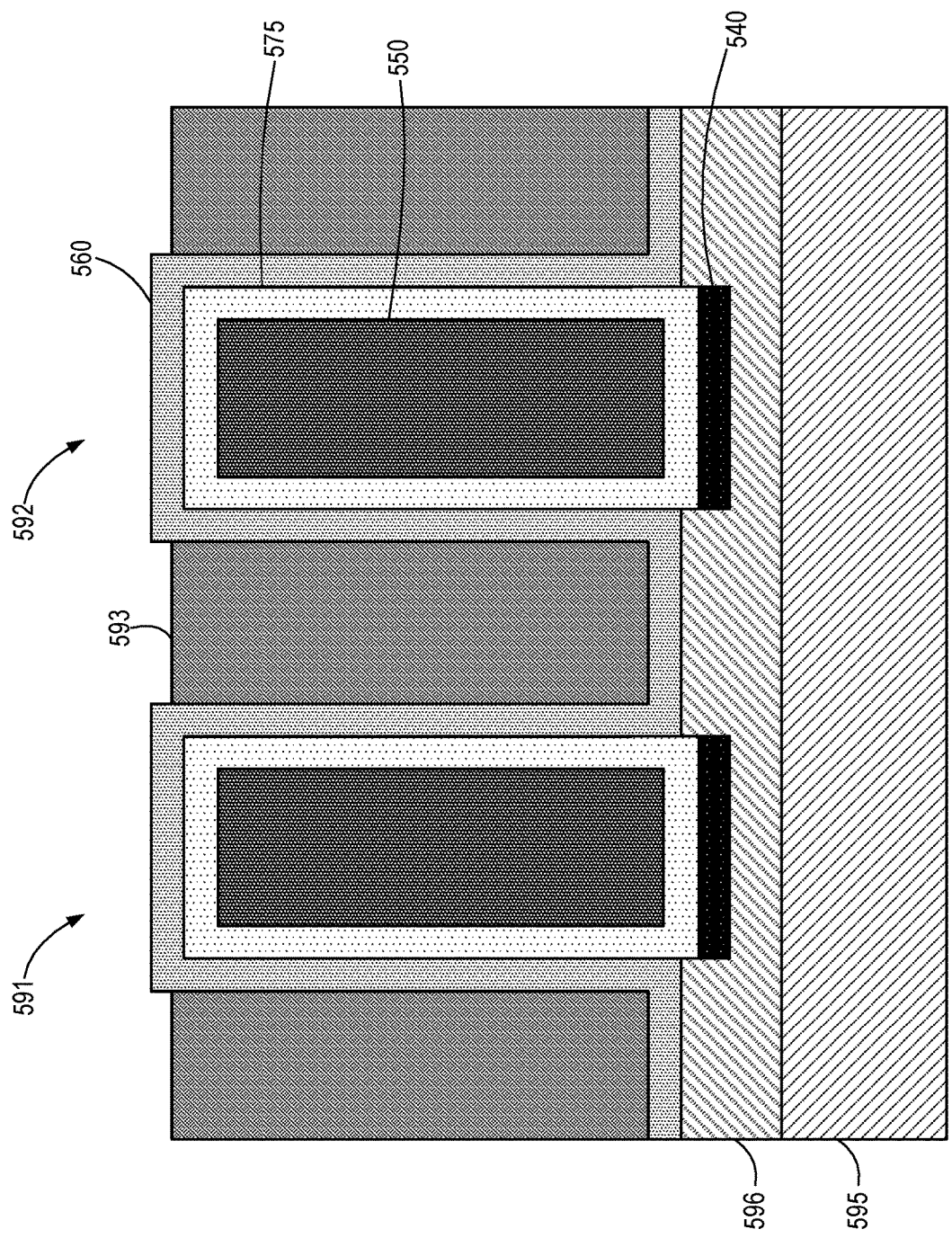
FIG. 5A illustrates an example diagram of two parallel, multicoated elongated metal rails of a tunable metasurface with an optically reflective metal coating on the bottom wall, the sidewalls, and the top wall, according to one embodiment.

FIG. 5A illustrates an example cross-sectional diagram of two parallel, multicoated elongated metal rails 591 and 592 of a tunable metasurface, according to one embodiment. As illustrated, each of the multicoated elongated metal rails 591 and 592 includes a conductive metal core 550 (e.g., copper) with an optically reflective metal coating 575 on all four walls. Liquid crystal 593 is positioned between the multicoated elongated metal rails 591 and 592. In the illustrated embodiment, the multicoated elongated metal rails 591 and 592 extend from an optical reflector layer (not shown) but are electrically isolated therefrom by a first dielectric layer 595 (e.g., a dielectric via layer) and a dielectric etch-stop layer 596. A conductive barrier material 540 facilitates through-substrate control line connections (e.g., for applying voltage differentials to the multicoated elongated metal rails 591 and 592).

The optically reflective metal coating 575 is applied to (e.g., deposited on) the sidewalls, the top wall, and the bottom wall of the conductive metal core 550 of each respective multicoated elongated metal rail 591 and 592. The optically reflective metal coating 575. A passivation coating 560 is applied as a second layer or coating on the conductive metal core 550 of each respective elongated metal rail 291 and 292. As previously described, the optically reflective metal coating 575 may be a relatively thin layer of silver, gold, cobalt, ruthenium, or a combination of layers or alloys thereof.

Figure 5B:
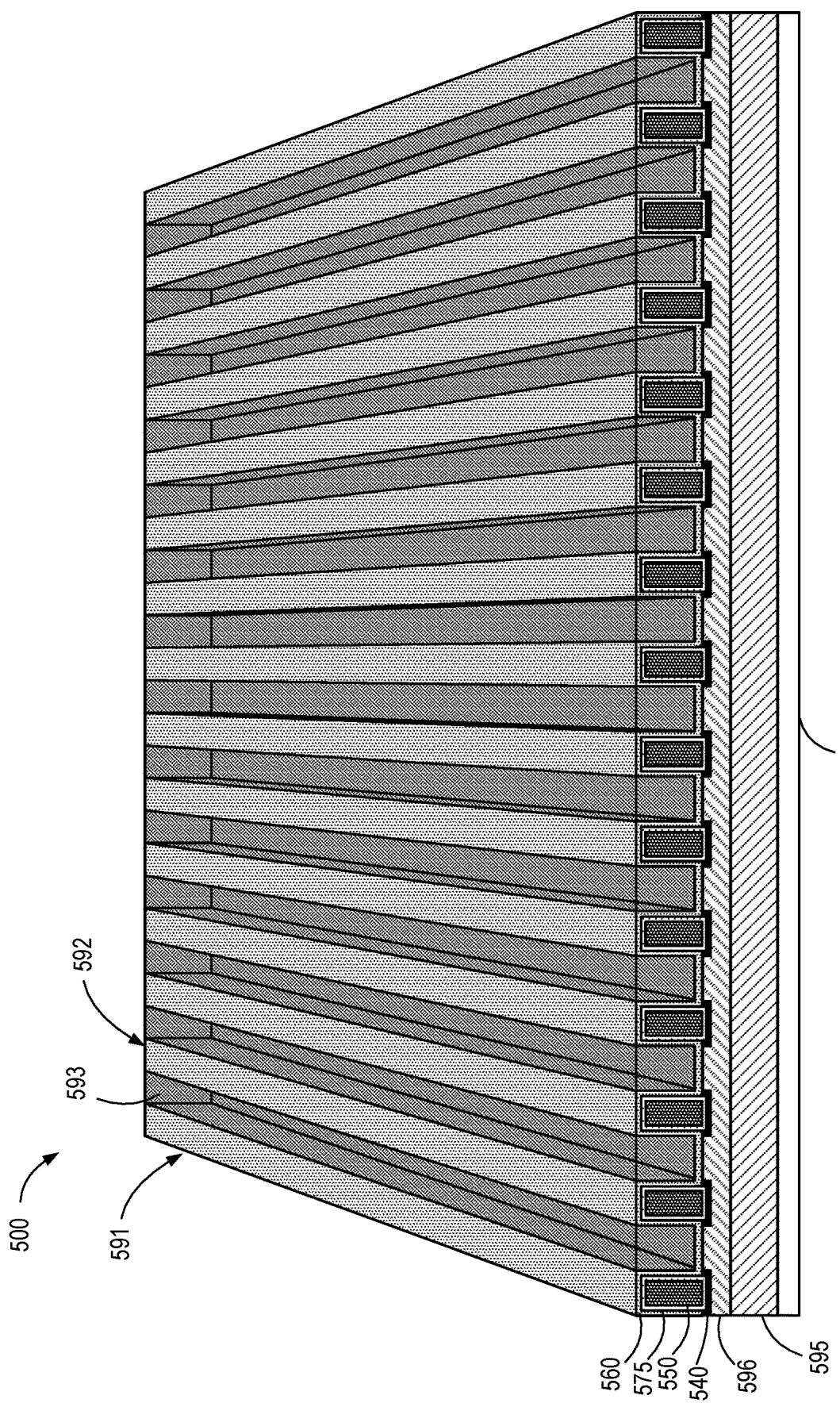
FIG. 5B illustrates an example diagram of a tunable metasurface with multicoated elongated metal rails of FIG. 5A, according to one embodiment.

FIG. 5B illustrates an example diagram of a tunable metasurface 500 with a one-dimensional array of the multicoated elongated metal rails of FIG. 5A, according to one embodiment. The multicoated elongated metal rails, including elongated metal rails 591 and 592, are arranged parallel to one another and extend from the optically reflective surface 590. The multicoated elongated metal rails 591 and 592 are separated from the optically reflective surface 590 by the dielectric layer 595 and the dielectric etch-stop layer 596. Each multicoated elongated metal rail 591 and 592, includes a conductive metal core 550 with an optically reflective metal coating 575 (e.g., silver) on all four walls, including the top wall, the sidewalls, and the bottom wall.

A passivation coating 560 also coats the sidewalls and the top wall of each conductive metal core 550 of each respective multicoated elongated metal rail (applied or deposited on top of the optically reflective metal coating 575). In the illustrated example, the passivation coating 560 comprises a conformal layer deposited on all surfaces, such that the passivation coating 560 is also deposited on the lower surface of each channel between each pair of adjacent multicoated elongated metal rails. Liquid crystal 593 is deposited within the channels defined by adjacent pairs of multicoated elongated metal rails.

FIGS. 6A-6J illustrate example diagrams of a manufacturing process for a metasurface with multicoated metal rails with an optically reflective metal coating on the bottom wall, the sidewalls, and the top wall, according to one embodiment.

Figure 6C:
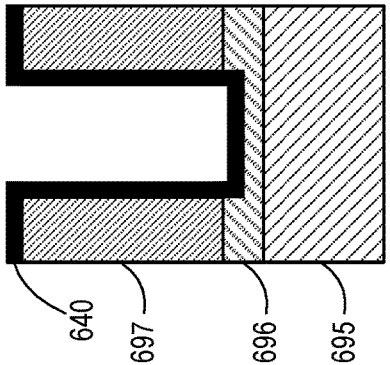
FIGS. 6A-6J illustrate example diagrams of a manufacturing process for a metasurface with multicoated metal rails with an optically reflective metal coating on the bottom wall, the sidewalls, and the top wall, according to one embodiment.
Figure 6B:
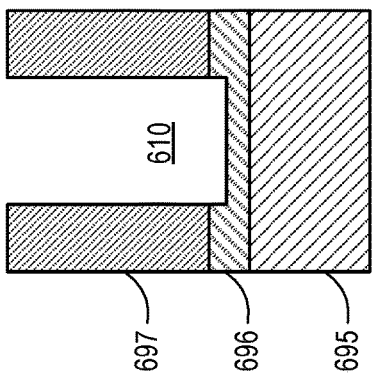
Figure 6A:
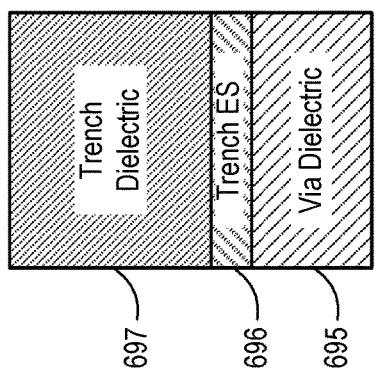

FIG. 6A illustrates a dielectric substrate that includes a dielectric via layer 695, a dielectric etch-stop layer 696, and a dielectric trench layer 697. As in other embodiments described herein, the dielectric via layer 695, the dielectric etch-stop layer 696, and the dielectric trench layer 697 may be formed as three separate layers or as the same layer. In some embodiments, the dielectric via layer 695 and the dielectric trench layer 697 may be the same material, while the dielectric etch-stop layer 696 may be a different material. An etching process may be utilized that is capable of etching the dielectric trench layer 697 but unable to etch or only slowly etch the dielectric etch-stop layer 696. In such embodiments, the dielectric etch-stop layer 696 functions to limit or control the depth to which a trench is etched within the dielectric substrate. For example, the dielectric via layer 695 and the dielectric trench layer 697 may comprise silicon (Si). The dielectric etch-stop layer 696 may comprise a silicon oxide layer that is resistive to some etching processes and/or etching solutions.

FIG. 6B illustrates a trench 610 etched in the dielectric trench layer 697 that stops at or slightly within the dielectric etch-stop layer 696. A method to manufacture a tunable optical device may include etching the dielectric trench layer 697 to form an array of parallel elongated trenches in the dielectric substrate. Each elongated trench 610 may have substantially vertical sidewalls separated by a base wall with subwavelength dimensions. The trench 610 may be etched using any of a wide variety of lithography and etching technologies and approaches, including any of the techniques and approaches described herein.

FIG. 6C illustrates a conductive barrier material 640, such as tantalum or tantalum nitride, deposited as a conformal layer within the trench 610 and outside of the trench 610 as well. Any of a wide variety of thin-film or layer deposition processes may be utilized to deposit the conductive barrier material 640 on at least the bottom wall of the trench. In some embodiments, selective deposition techniques may be utilized to limit the deposition of the conductive barrier material 640 to the base wall of the trench 610.

Figure 6F:
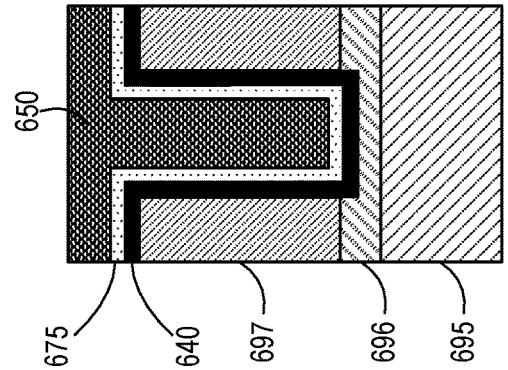
Figure 6E:
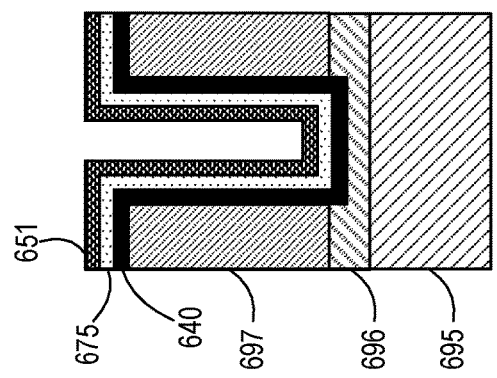
Figure 6D:
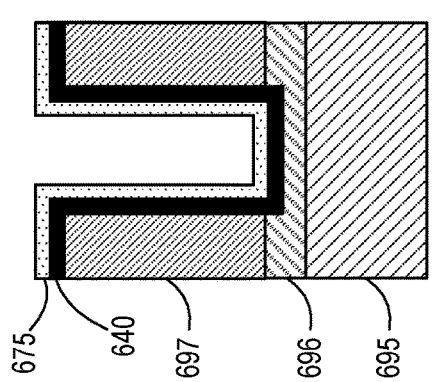

FIG. 6D illustrates an optically reflective metal coating 675, such as silver, applied to the sidewalls and bottom wall of the trench 610 on top of the conductive barrier material 640. In various embodiments, the optically reflective metal coating 675 comprises a thin layer of silver. In other embodiments, the optically reflective metal coating 675 comprises one or more layers of silver, gold, cobalt, and/or ruthenium. The optically reflective metal coating 675 may be applied using chemical vapor deposition or sputtering techniques. Alternatively, the optically reflective metal coating 675 may be applied using selective atomic layer deposition, electroless deposition, or another selective deposition technique.

FIG. 6E illustrates a conductive metal seed 651 deposition within the trench 610 on top of the optically reflective metal coating 675 and the conductive barrier material 640. In various embodiments, the conductive metal seed 651 is copper or a copper alloy. In alternative embodiments, the conductive metal seed 651 may comprise one or more of, or a combination of, copper, aluminum, and tungsten. In some embodiments, the conductive metal seed 651 may be deposited using a chemical vapor deposition process, a sputtering process, or another thin-film deposition process. In some embodiments, selective deposition techniques may be utilized to limit the deposition of the conductive metal seed 651 to only cover the sidewalls and/or base wall of the trench 610.

FIG. 6F illustrates the trench 610 filled with a conductive metal that ultimately forms the conductive metal core 650 of a fully formed multicoated elongated metal rail. According to various embodiments, the conductive metal core 650 is deposited within the trench 610 using electrochemical plating (ECP), with the conductive metal seed 651 serving as the "seed" to control the selective deposition.

Figure 6G:
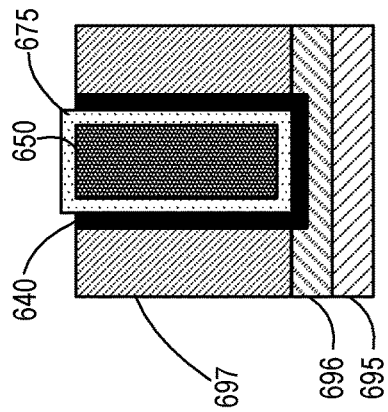

FIG. 6G illustrates the conductive metal core 650 and the conductive barrier material 640 within the trench after a chemical mechanical planarization (CMP) process.

Figure 6H:
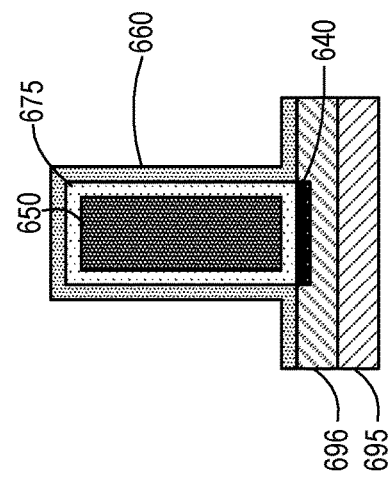

FIG. 6H illustrates a cap of the optically reflective metal coating 675 applied via a selective deposition process to the top wall of the conductive metal core 650.

Figure 6I:
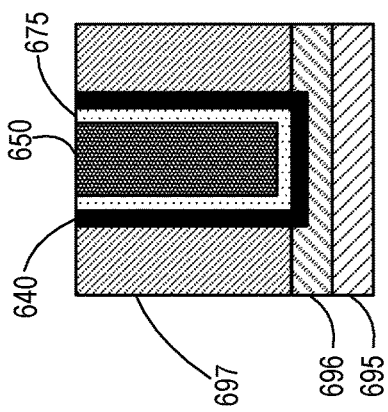

FIG. 6I illustrates the material on either side of the conductive metal core 650 removed, including the dielectric trench layer 697 and the conductive barrier material 640 on the sidewalls of the trench 610. An array of parallel elongated metal rails with conductive metal cores 650 are exposed that are spaced from one another to form channels therebetween. The conductive metal core 650 of each elongated metal rail includes opposing sidewalls, a top wall, and a base wall. The base wall of the conductive metal core 650 of each elongated metal rail is separated from the dielectric etch-stop layer 696 by the remaining region (patch or layer) of the conductive barrier material 640.

Figure 6J:
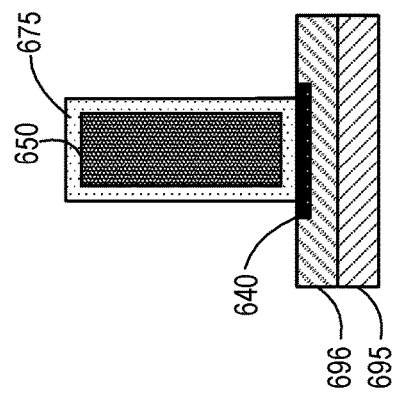

FIG. 6J illustrates a second coating applied to the conductive metal core 650 of each elongated metal rail. The second coating is a passivation coating 660 (or passivation layer) that is applied over the optically reflective metal coating 675 previously applied to the conductive metal core 650. The passivation coating 660 operates to passivate the optically reflective metal coating 675. The passivation coating 660 may be, for example, a thin film or layer of silicon nitride. The passivation coating 660 may be applied using any of the various deposition techniques described herein. In some embodiments, the passivation coating 660 may be applied as a conformal layer over the elongated metal rails and within the channels between adjacent elongated metal rails.

Figure 7A:
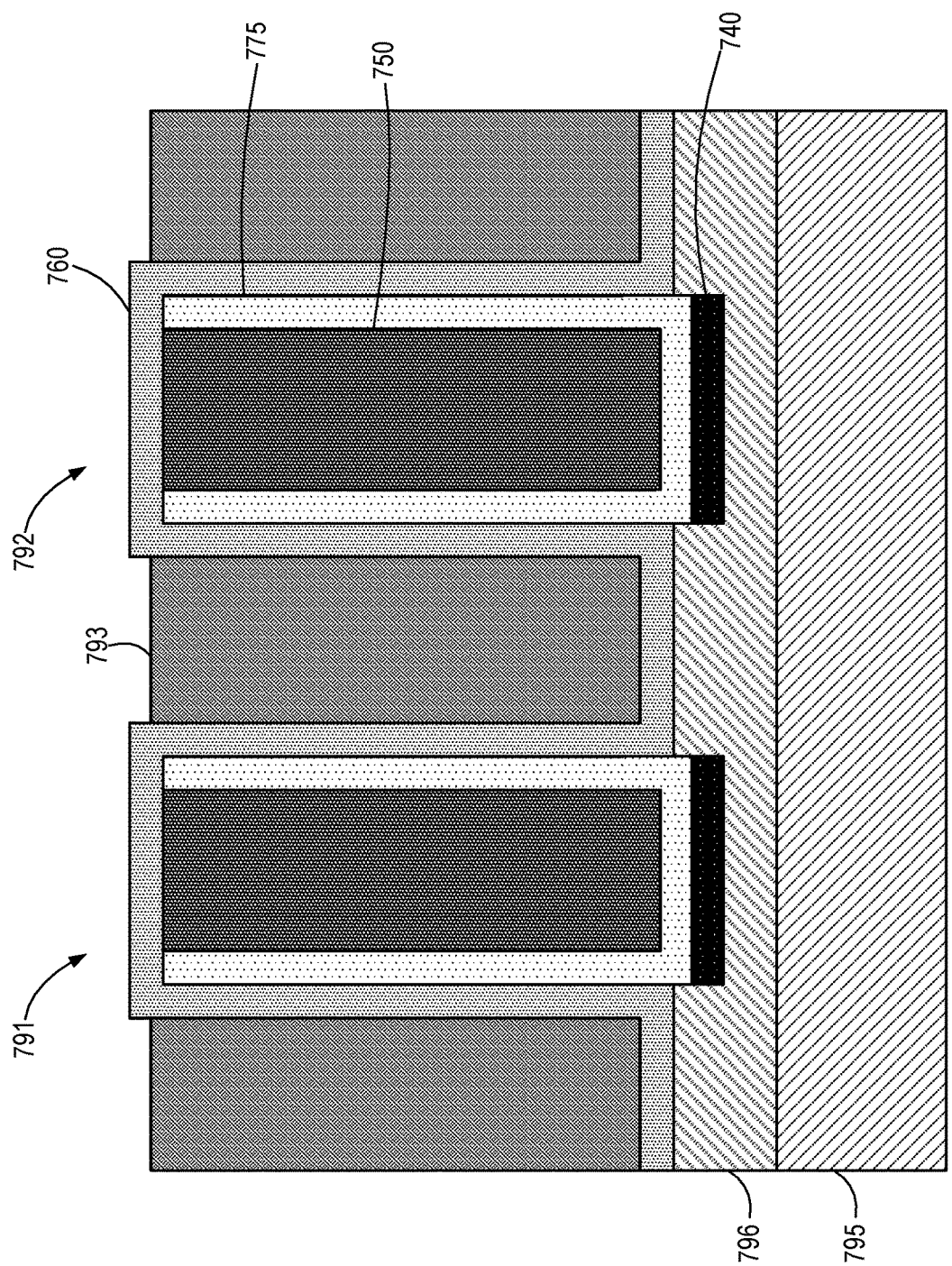
FIG. 7A illustrates an example diagram of two parallel, multicoated elongated metal rails of a tunable metasurface with an optically reflective metal coating on the bottom wall and the sidewalls, according to one embodiment.

FIG. 7A illustrates an example cross-sectional diagram of two parallel, multicoated elongated metal rails 791 and 792 of a tunable metasurface, according to one embodiment. The conductive metal core 750 of each multicoated elongated metal rail 791 and 792 includes an optically reflective metal coating 775 on the bottom wall and the sidewalls. Liquid crystal 793 is positioned between the multicoated elongated metal rails 791 and 792. The multicoated elongated metal rails 791 and 792 extend from an optical reflector layer (not shown) but are electrically isolated therefrom by a first dielectric layer 795 (e.g., a dielectric via layer) and a dielectric etch-stop layer 796. A conductive barrier material 740 facilitates through-substrate control line connections (e.g., for applying voltage differentials to the multicoated elongated metal rails 791 and 792).

The optically reflective metal coating 775 is applied to (e.g., deposited on) the sidewalls and the bottom wall of the conductive metal core 750 of each respective multicoated elongated metal rail 791 and 792. Notably, and in contrast to the embodiment illustrated in FIG. 5A, the top wall of the conductive metal core 750 of each respective multicoated elongated metal rail 791 and 792 is not capped with the optically reflective metal coating 775.

A passivation coating 760 is applied as a second layer or coating on the conductive metal core 750 of each respective elongated metal rail 791 and 792. Specifically, the passivation coating 760 is applied on top of the optically reflective metal coating 775 on the sidewalls of the conductive metal core 750 but directly on the top wall of the conductive metal core 750. As previously described, the optically reflective metal coating 775 may be a relatively thin layer of silver, gold, cobalt, ruthenium, or a combination of layers thereof. The passivation coating 760 may be a relatively thin layer or coating of silicon nitride.

Figure 7B:
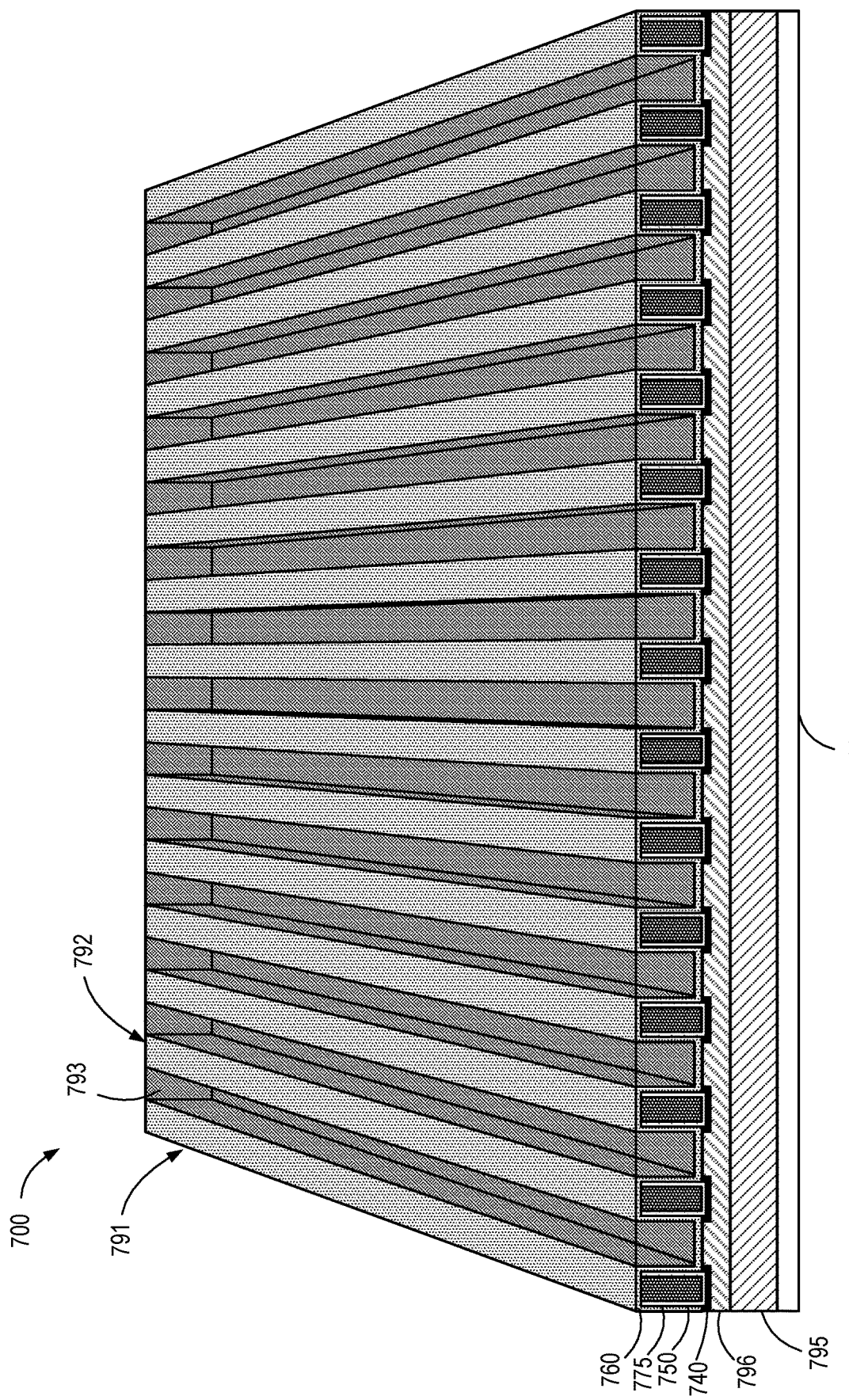
FIG. 7B illustrates an example diagram of a tunable metasurface with multicoated elongated metal rails of FIG. 7A, according to one embodiment.

FIG. 7B illustrates an example diagram of a tunable metasurface 700 with a one-dimensional array of the multicoated elongated metal rails of FIG. 7A, according to one embodiment. The multicoated elongated metal rails, including elongated metal rails 791 and 792, are arranged parallel to one another and extend from the optically reflective surface 790. The multicoated elongated metal rails 791 and 792 are separated from the optically reflective surface 790 by the dielectric layer 795 and the dielectric etch-stop layer 796. Each multicoated elongated metal rail 791 and 792, includes a conductive metal core 750 with an optically reflective metal coating 775 (e.g., silver) on a bottom wall and on the opposing sidewalls.

A passivation coating 760 coats the sidewalls (as a second coding applied on top of the optically reflective metal coating 775) and the top wall of each conductive metal core 750 of each respective multicoated elongated metal rail. In the illustrated example, the passivation coating 760 comprises a conformal layer deposited on all surfaces, such that the passivation coating 760 is also deposited on the lower surface of each channel between each pair of adjacent multicoated elongated metal rails. Liquid crystal 793 is deposited within the channels defined by adjacent pairs of multicoated elongated metal rails.

FIGS. 8A-8I illustrate example diagrams of a manufacturing process for a metasurface with multicoated metal rails with an optically reflective metal coating on the bottom wall and the sidewalls, according to one embodiment.

Figure 8A:
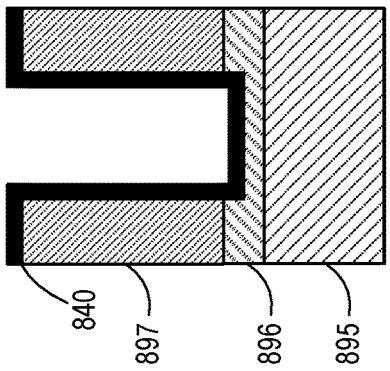
FIGS. 8A-8I illustrate example diagrams of a manufacturing process for a metasurface with multicoated metal rails with an optically reflective metal coating on the bottom wall and the sidewalls, according to one embodiment.

FIG. 8A illustrates a dielectric substrate that includes a dielectric via layer 895, a dielectric etch-stop layer 896, and a dielectric trench layer 897. As in other embodiments, the dielectric via layer 895, the dielectric etch-stop layer 896, and the dielectric trench layer 897 may be formed as three separate layers, as two layers, or as a single layer. In some embodiments, the dielectric via layer 895 and the dielectric trench layer 897 may be the same material, while the dielectric etch-stop layer 896 may be a different material. An etching process may be utilized that etches the dielectric trench layer 897 but is unable to etch or only slowly etch the dielectric etch-stop layer 896. In such embodiments, the dielectric etch-stop layer 896 functions to limit or control the depth to which a trench is etched within the dielectric substrate. For example, the dielectric via layer 895 and the dielectric trench layer 897 may comprise silicon (Si). The dielectric etch-stop layer 896 may comprise a silicon oxide layer that is resistive to some etching processes and/or etching solutions.

Figure 8B:
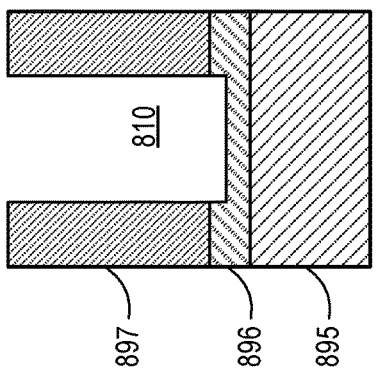

FIG. 8B illustrates a trench 810 etched in the dielectric trench layer 897 that stops at or slightly within the dielectric etch-stop layer 896. A method to manufacture a tunable optical device may include etching the dielectric trench layer 897 to form an array of parallel elongated trenches in the dielectric substrate. Each elongated trench 810 may have substantially vertical sidewalls separated by a base wall with subwavelength dimensions. The trench 810 may be etched using any of a wide variety of lithography and etching technologies and approaches, including any of the techniques and approaches described herein.

Figure 8C:
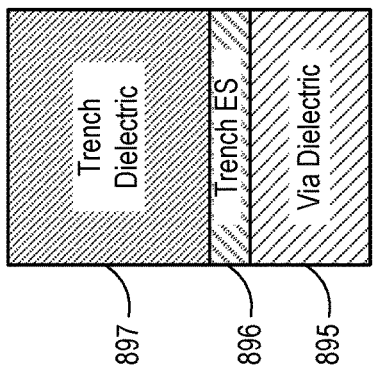

FIG. 8C illustrates a conductive barrier material 840, such as tantalum or tantalum nitride, deposited as a conformal layer within the trench 810 and outside of the trench 810 as well. Any of a wide variety of thin-film or layer deposition processes may be utilized to deposit the conductive barrier material 840 on at least the bottom wall of the trench. In some embodiments, selective deposition techniques may be utilized to limit the deposition of the conductive barrier material 840 to the base wall of the trench 810.

Figure 8D:
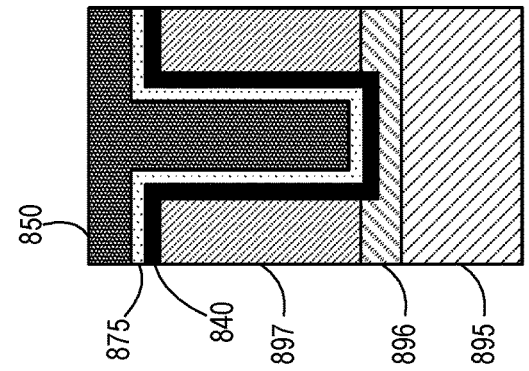

FIG. 8D illustrates an optically reflective metal coating 675, such as silver, applied to the sidewalls and bottom wall of the trench 610 on top of the conductive barrier material 840. In various embodiments, the optically reflective metal coating 875 comprises a thin layer of silver. In other embodiments, the optically reflective metal coating 875 comprises one or more layers of silver, gold, cobalt, and/or ruthenium. The optically reflective metal coating 875 may be applied using chemical vapor deposition or sputtering techniques. Alternatively, the optically reflective metal coating 875 may be applied using selective atomic layer deposition, electroless deposition, or another selective deposition technique.

Figure 8E:
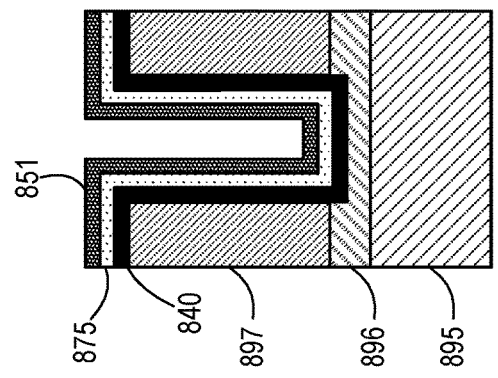

FIG. 8E illustrates a conductive metal seed 851 deposition within the trench 810 on top of the optically reflective metal coating 875 and the conductive barrier material 840. In various embodiments, the conductive metal seed 851 is copper or a copper alloy. In alternative embodiments, the conductive metal seed 851 may comprise one or more of, or a combination of, copper, aluminum, and tungsten. In some embodiments, the conductive metal seed 851 may be deposited using a chemical vapor deposition process, a sputtering process, or another thin-film deposition process. In some embodiments, selective deposition techniques may be utilized to limit the deposition of the conductive metal seed 851 to only cover the sidewalls and/or base wall of the trench 810.

Figure 8F:
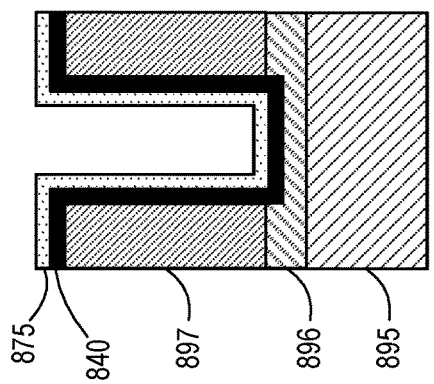

FIG. 8F illustrates the trench 610 filled with a conductive metal that ultimately forms the conductive metal core 850 of a fully formed multicoated elongated metal rail. According to various embodiments, the conductive metal core 850 is deposited within the trench 810 using electrochemical plating (ECP), with the conductive metal seed 851 serving as the "seed" to control the selective deposition.

Figure 8I:
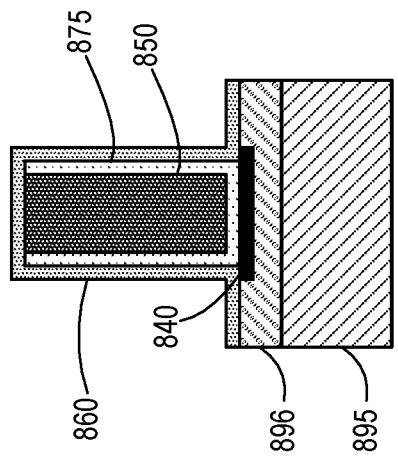
Figure 8H:
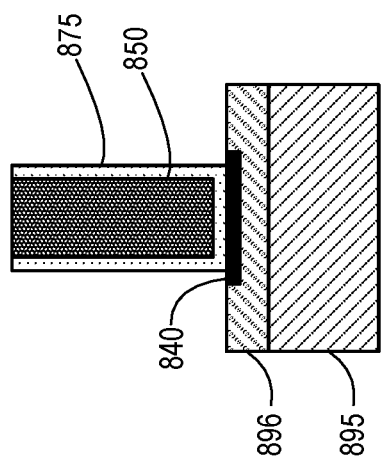
Figure 8G:
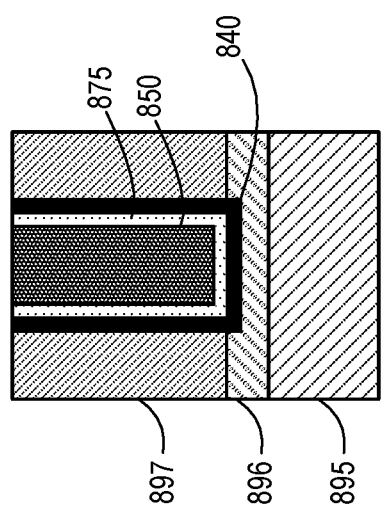

FIG. 8G illustrates the conductive metal core 850 and the conductive barrier material 840 within the trench after a chemical mechanical planarization (CMP) process.

FIG. 8H illustrates the material on either side of the conductive metal core 850 removed, including the dielectric trench layer 897 and the conductive barrier material 840 on the sidewalls of the trench 810. The removal process reveals an array of parallel elongated metal rails with conductive metal cores 850 that are spaced from one another to form channels therebetween. The conductive metal core 850 of each elongated metal rail includes opposing sidewalls, a top wall, and a base wall. The base wall of the conductive metal core 850 of each elongated metal rail is separated from the dielectric etch-stop layer 896 by the remaining region (patch or layer) of the conductive barrier material 840.

FIG. 8I illustrates a second coating applied to the conductive metal core 850 of each elongated metal rail. The second coating is a passivation coating 860 (or passivation layer) that is applied over the optically reflective metal coating 875 previously applied to the sidewalls of the conductive metal core 850. The passivation coating 860 is also applied directly to the top wall of the conductive metal core 850 (e.g., directly on an exposed top wall of copper of a conductive copper core). The passivation coating 860 operates to passivate the optically reflective metal coating 875. The passivation coating 860 may be, for example, a thin film or layer of silicon nitride. The passivation coating 860 may be applied using any of the various deposition techniques described herein. In some embodiments, the passivation coating 860 may be applied as a conformal layer over the elongated metal rails and within the channels between adjacent elongated metal rails.

Figure 9A:
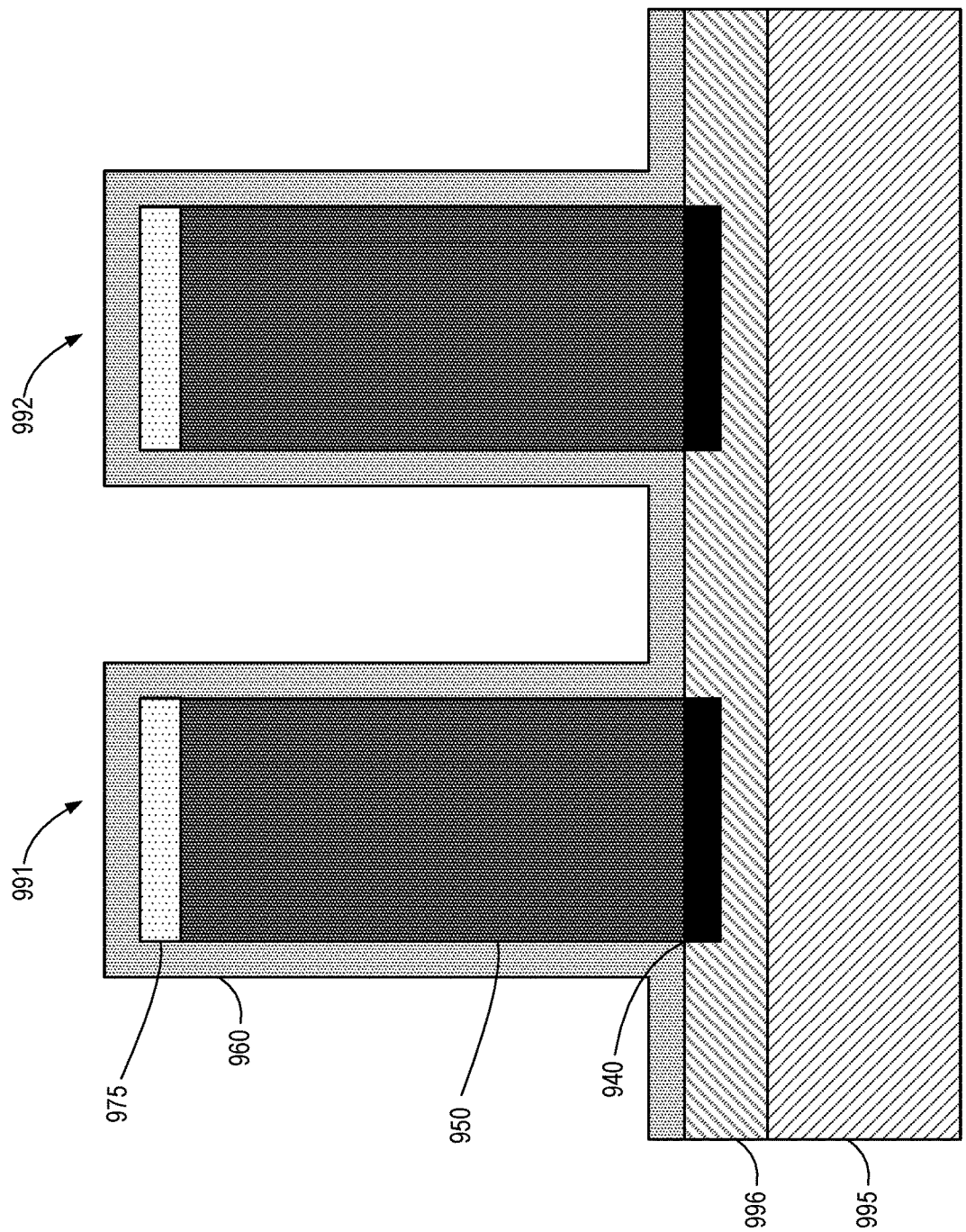
FIG. 9A illustrates an example diagram of two parallel, multicoated elongated metal rails of a tunable metasurface with an optically reflective metal coating on the top wall, according to one embodiment.

FIG. 9A illustrates an example diagram of two parallel, multicoated elongated metal rails 991 and 992 of a tunable metasurface, according to one embodiment. The conductive metal core 950 of each multicoated elongated metal rail 991 and 992 includes an optically reflective metal coating 975 on only the top wall. Liquid crystal (not shown) can be positioned between the multicoated elongated metal rails 991 and 992. The multicoated elongated metal rails 991 and 992 may extend from an optical reflector layer (not shown) but are electrically isolated therefrom by a first dielectric layer 995 (e.g., a dielectric via layer) and a dielectric etch-stop layer 996. A conductive barrier material 940 facilitates through-substrate control line connections (e.g., for applying voltage differentials to the multicoated elongated metal rails 991 and 992).

The optically reflective metal coating 975 is applied to (e.g., deposited on) the top wall of the conductive metal core 950 of each respective multicoated elongated metal rail 991 and 992. A passivation coating 960 is applied as a second layer or coating on the conductive metal core 950 of each respective elongated metal rail 991 and 992. The passivation coating 960 is applied as a second coating over the optically reflective metal coating 975 on the top wall of the conductive metal core 950. The passivation coating 960 is deposited directly on the sidewalls of the conductive metal core 950 (e.g., directly on the exposed copper sidewalls in embodiments in which the conductive metal core 950 is made of copper). As previously described, the optically reflective metal coating 975 may be a relatively thin layer of silver, gold, cobalt, ruthenium, or a combination of layers thereof. The passivation coating 960 may be a relatively thin layer or coating of silicon nitride.

Figure 9B:
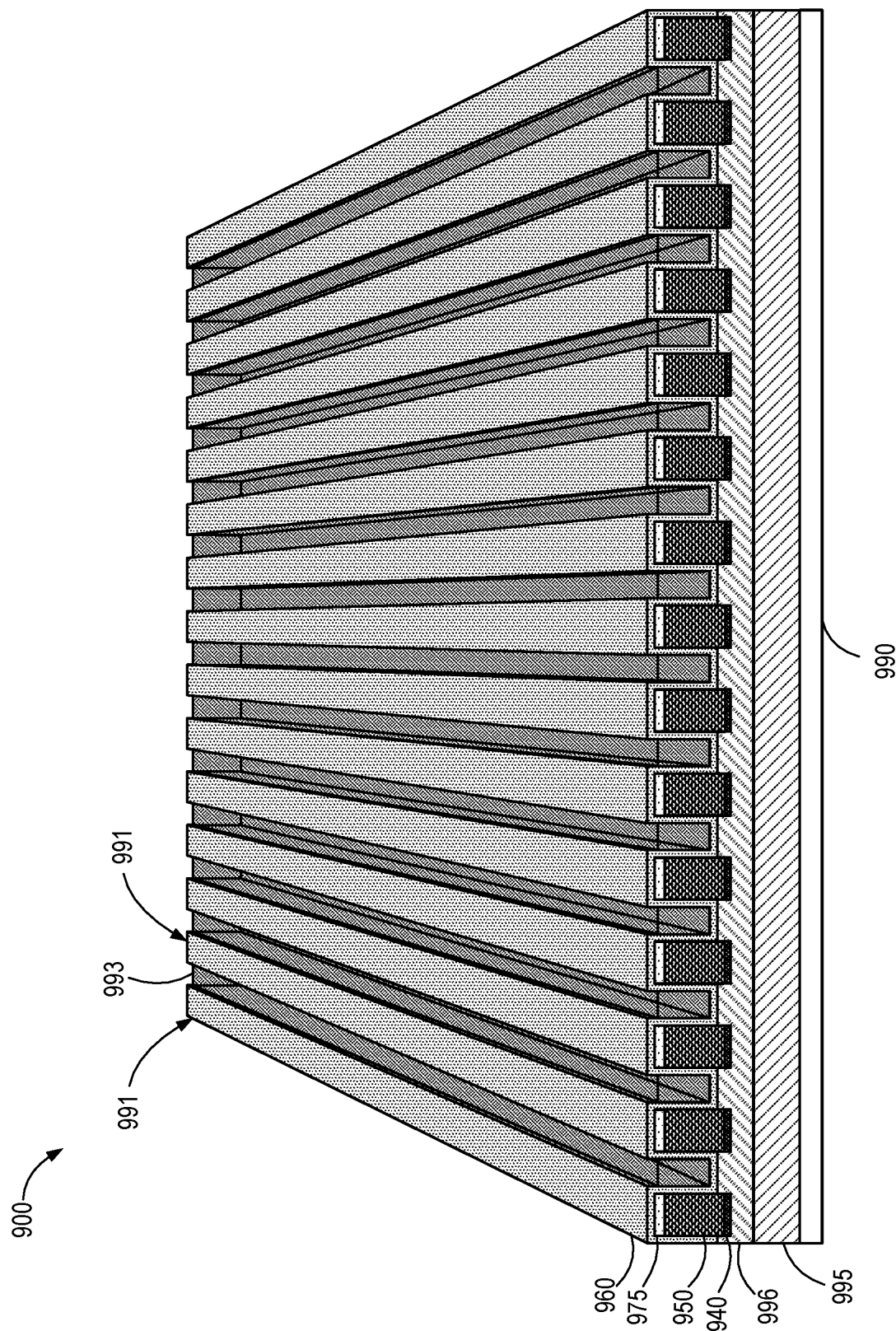
FIG. 9B illustrates an example diagram of a tunable metasurface with multicoated elongated metal rails of FIG. 9A, according to one embodiment.

FIG. 9B illustrates an example diagram of a tunable metasurface 900 with a one-dimensional array of the multicoated elongated metal rails of FIG. 9A, according to one embodiment. The multicoated elongated metal rails, including elongated metal rails 791 and 792, are arranged parallel to one another and extend from the optically reflective surface 790. The multicoated elongated metal rails 991 and 992 are separated from the optically reflective surface 990 by the dielectric layer 995 and the dielectric etch-stop layer 996. Each multicoated elongated metal rail 991 and 992, includes a conductive metal core 950 with an optically reflective metal coating 975 (e.g., silver) on only the top wall.

A passivation coating 960 directly coats the sidewalls of the optically reflective metal coating 975 and provides a second coating on the top wall (over the optically reflective metal coating 975) of each conductive metal core 950 of each respective multicoated elongated metal rail. In the illustrated example, the passivation coating 960 comprises a conformal layer deposited on all surfaces, such that the passivation coating 960 is also deposited on the lower surface of each channel between each pair of adjacent multicoated elongated metal rails.

Liquid crystal 993 is deposited within the channels defined by adjacent pairs of multicoated elongated metal rails. In some embodiments, the liquid crystal 993 is deposited within the channels to at least partially fill each channel, completely fill each channel to the height of the passivation coating 960, fill each channel to a height of the conductive metal core 950, fill each channel to a height of the optically reflective metal coating 975, and/or overfill the channels such that a layer of liquid crystal 993 is positioned above the one-dimensional array of multicoated elongated metal rails.

FIGS. 10A-10I illustrate example diagrams of a manufacturing process for a metasurface with multicoated metal rails with an optically reflective metal coating on only the top wall, according to one embodiment.

Figure 10A:
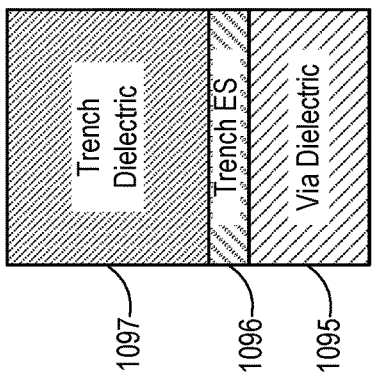
FIGS. 10A-10I illustrate example diagrams of a manufacturing process for a metasurface with multicoated metal rails with an optically reflective metal coating on the top wall, according to one embodiment.

FIG. 10A illustrates a dielectric substrate that includes a dielectric via layer 1095, a dielectric etch-stop layer 1096, and a dielectric trench layer 1097. As in other embodiments described herein, the dielectric via layer 1095, the dielectric etch-stop layer 1096, and the dielectric trench layer 1097 may be formed as three separate layers or as the same layer. In some embodiments, the dielectric via layer 1095 and the dielectric trench layer 1097 may be the same material, while the dielectric etch-stop layer 1096 may be a different material. An etching process may be utilized that is capable of etching the dielectric trench layer 1097 but unable to etch or only slowly etch the dielectric etch-stop layer 1096. In such embodiments, the dielectric etch-stop layer 1096 functions to limit or control the depth to which a trench is etched within the dielectric substrate. For example, the dielectric via layer 1095 and the dielectric trench layer 1097 may comprise silicon (Si). The dielectric etch-stop layer 1096 may comprise a silicon oxide layer that is resistive to some etching processes and/or etching solutions.

Figure 10B:
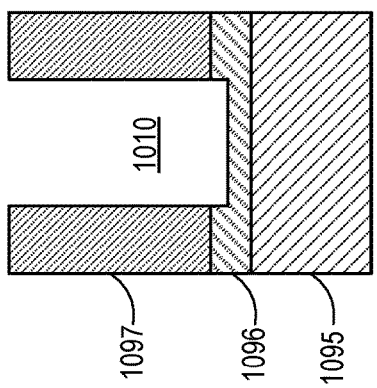

FIG. 10B illustrates a trench 1010 etched in the dielectric trench layer 1097 that stops at or slightly within the dielectric etch-stop layer 1096. A method to manufacture a tunable optical device may include etching the dielectric trench layer 1097 to form an array of parallel elongated trenches in the dielectric substrate. Each elongated trench 1010 may have substantially vertical sidewalls separated by a base wall with subwavelength dimensions. The trench 1010 may be etched using any of a wide variety of lithography and etching technologies and approaches, including any of the techniques and approaches described herein.

Figure 10C:
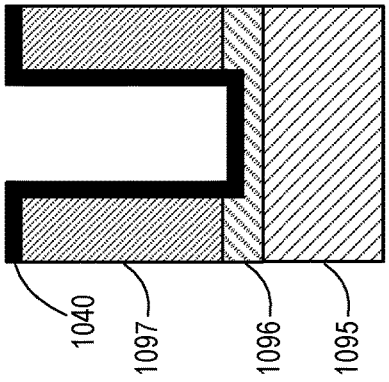

FIG. 10C illustrates a conductive barrier material 1040, such as tantalum or tantalum nitride, deposited as a conformal layer within the trench 1010 and outside of the trench 1010 as well. Any of a wide variety of thin-film or layer deposition processes may be utilized to deposit the conductive barrier material 1040 on at least the bottom wall of the trench. In some embodiments, selective deposition techniques may be utilized to limit the deposition of the conductive barrier material 1040 to the base wall of the trench 1010.

Figure 10D:
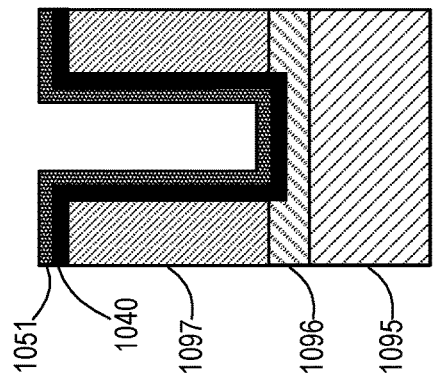

FIG. 10D illustrates a conductive metal seed 1051 deposition within the trench 1010 on top of the conductive barrier material 1040. In various embodiments, the conductive metal seed 1051 is copper or a copper alloy. In alternative embodiments, the conductive metal seed 1051 may comprise one or more of, or a combination of, copper, aluminum, and tungsten. In some embodiments, the conductive metal seed 1051 may be deposited using a chemical vapor deposition process, a sputtering process, or another thin-film deposition process. In some embodiments, selective deposition techniques may be utilized to limit the deposition of the conductive metal seed 1051 to only cover the sidewalls and/or base wall of the trench 1010.

Figure 10E:
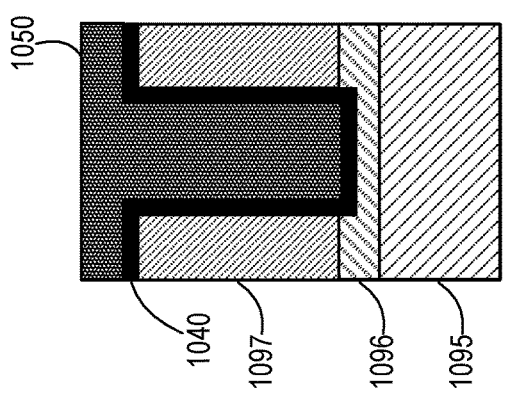

FIG. 10E illustrates the trench 1010 filled with a conductive metal that ultimately forms the conductive metal core 1050 of a fully formed multicoated elongated metal rail. According to various embodiments, the conductive metal core 1050 is deposited within the trench 1010 using electrochemical plating (ECP), with the conductive metal seed 1051 serving as the "seed" to control the selective deposition.

Figure 10F:
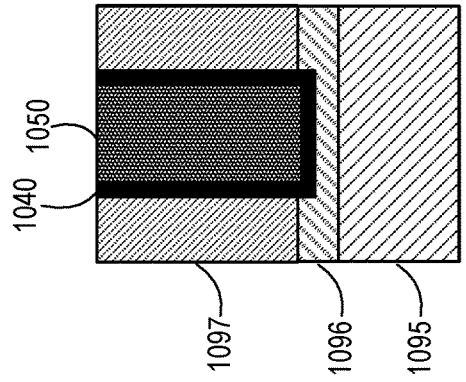

FIG. 10F illustrates the conductive metal core 1050 and the conductive barrier material 1040 within the trench after a chemical mechanical planarization (CMP) process. The chemical mechanical planarization process may be used to remove the portions of the conductive metal core 1050 and the conductive barrier material 1040 that are deposited outside of the trench 1010.

Figure 10I:
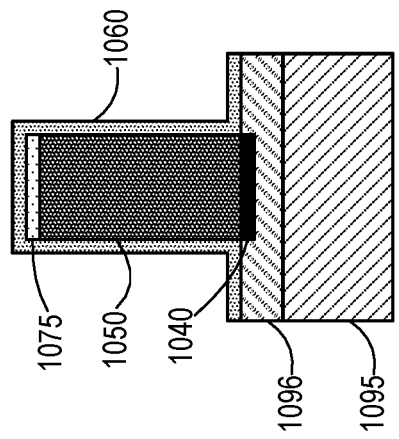
Figure 10H:
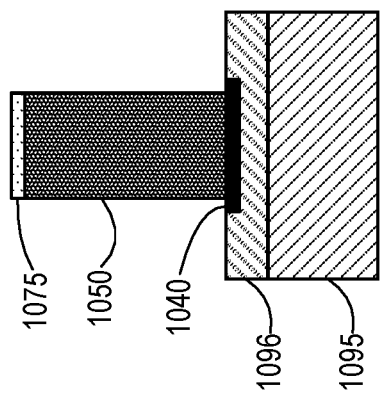
Figure 10G:
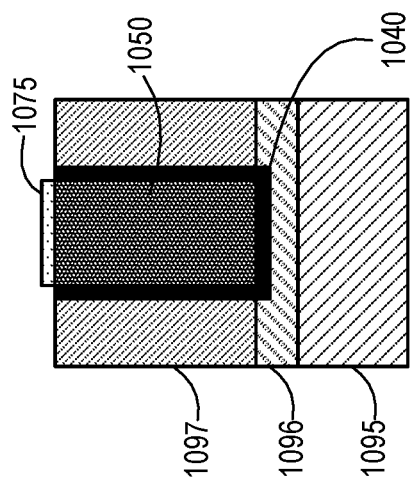

FIG. 10G illustrates a cap of the optically reflective metal coating 1075 applied via a selective deposition process to the top wall of the conductive metal core 1050.

FIG. 10H illustrates the material on either side of the conductive metal core 1050 removed, including the dielectric trench layer 1097 and the conductive barrier material 1040 on the sidewalls of the trench 1010. An array of parallel elongated metal rails with conductive metal cores 1050 are revealed. The elongated metal rails with conductive metal cores have top walls coated with the optically reflective metal coating 1075 and are spaced from one another to form channels therebetween. The base wall of the conductive metal core 1050 of each elongated metal rail is separated from the dielectric etch-stop layer 1096 by the remaining region of the conductive barrier material 1040.

FIG. 10I illustrates a second coating applied to the conductive metal core 1050 of each elongated metal rail. The second coating is a passivation coating 1060 applied over the optically reflective metal coating 1075 on the top wall of the conductive metal core 1050 and directly on the exposed sidewalls of the conductive metal core 1050. The passivation coating 1060 operates to passivate the optically reflective metal coating 1075 and the exposed sidewalls of the conductive metal core 1050. The passivation coating 1060 may be, for example, a thin film or layer of silicon nitride. The passivation coating 1060 may be applied using any of the various deposition techniques described herein. In some embodiments, the passivation coating 1060 may be applied as a conformal layer over the elongated metal rails and within the channels between adjacent elongated metal rails.

Figure 11:
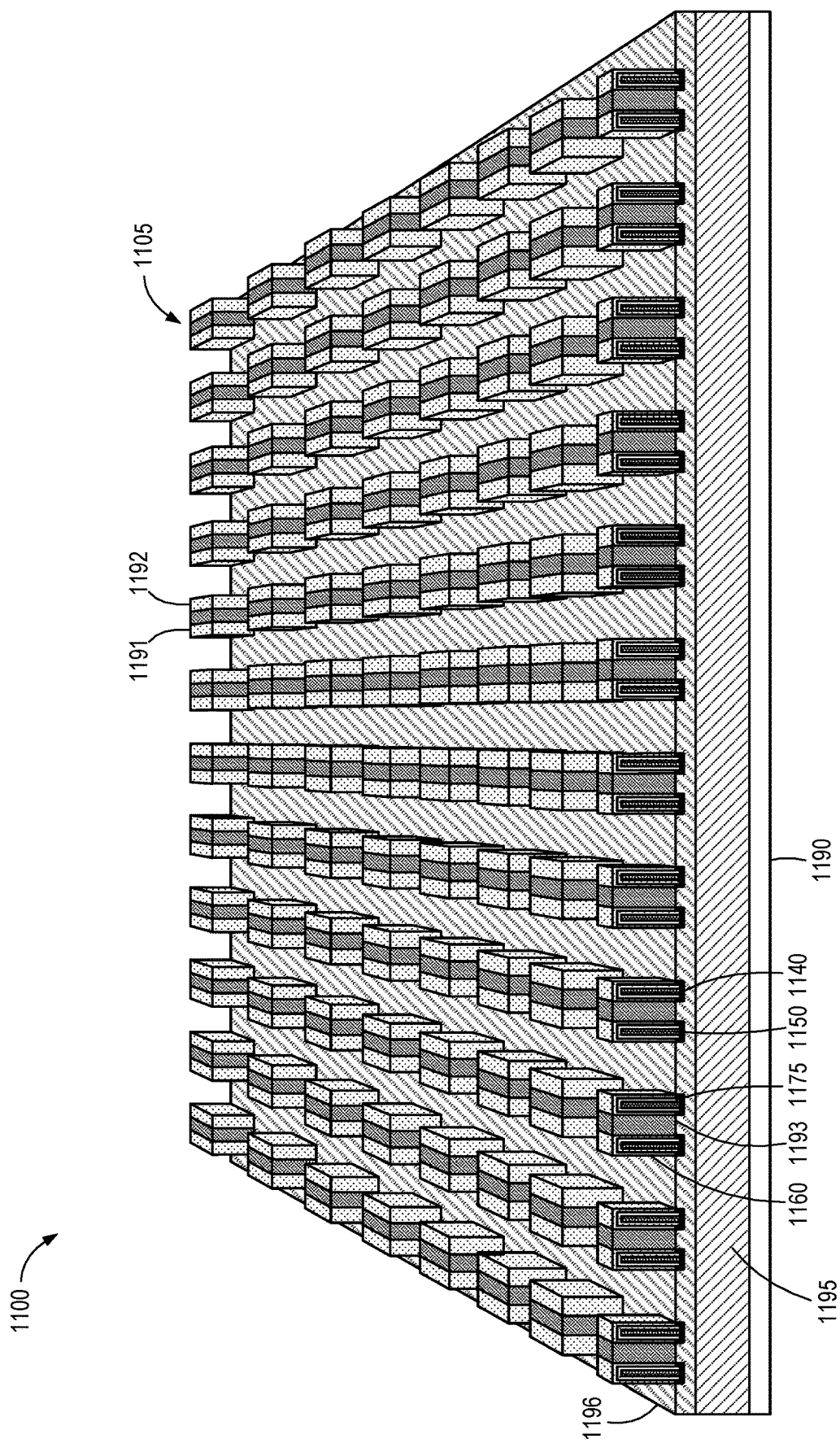
FIG. 11 illustrates a simplified embodiment of an optical surface scattering device with pairs of multicoated metal pillars with adjustable refractive index material therebetween, according to one embodiment.

FIG. 11 illustrates a simplified embodiment of an optical metasurface 1100 with a two-dimensional array of multicoated rectangular metal pillar pairs 1105, according to one embodiment. Each multicoated rectangular metal pillar pair 1105 includes two multicoated rectangular metal pillars 1191 and 1192 with adjustable refractive index material 1193 deposited between them. In the illustrated example, the optical metasurface 1100 includes one hundred and ninety-two multicoated rectangular metal pillars arranged in ninety-six pillar pairs. Each pair of multicoated rectangular metal pillars may function as a dielectric resonator structure. While outside the scope of this disclosure, a more thorough description and several variations of optical surface scattering devices utilizing two-dimensional arrays of pillars of various shapes and sizes can be found in the patent applications and patent publications identified and incorporated by reference herein.

The presently described multicoated metal pillar approach described herein can be applied and utilized in conjunction with any of the various arrangements and configurations of two-dimensional arrays of subwavelength resonant elements described in the various disclosures incorporated by reference herein. As illustrated, each multicoated rectangular metal pillar 1191 and 1192 extends from an optically reflective surface 1190 but is electrically isolated therefrom by the dielectric layer 1195 (e.g., a dielectric via layer) and the dielectric etch-stop layer 1196.

The front row of multicoated rectangular metal pillar pairs 1105 is shown as a cut-away cross-section to illustrate the internal layers and elements of each multicoated rectangular metal pillar. As illustrated, each multicoated rectangular metal pillar 1191 includes a conductive metal core 1150, such as a copper metal core, that is formed on a conductive barrier material 1140, such as a tantalum-based barrier layer, on the dielectric etch-stop layer 1196. In the illustrated example, an optically reflective metal coating 1175 is illustrated that is deposited on five sides of the conductive metal core 1150.

Specifically, the optically reflective metal coating 1175, such as a silver coating, is applied to the four sidewalls of each conductive metal core 1150 and the top wall of each conductive metal core 1150. Variations of the two-dimensional array of multicoated rectangular metal pillar pairs 1105 may be implemented in which the bottom wall of each conductive metal core 1150 is also coated with the optically reflective metal coating 1175. Alternatively, variations of the two-dimensional array of multicoated rectangular metal pillar pairs 1105 may be implemented in which the top wall of each conductive metal core 1150 is not coated with the optically reflective metal coating 1175 and/or one or more of the sidewalls is not coated with the optically reflective metal coating 1175.

As illustrated, a passivation layer 1160 is deposited to cover the optically reflective metal coating 1175 and/or any otherwise-exposed surfaces of the conductive metal core 1150. In some embodiments, the passivation layer 1160 may also be applied to the surface of the dielectric etch-stop layer 1196 and/or to the surface between each multicoated rectangular metal pillar pair 1105, where the adjustable refractive index material 1193 is deposited.

In some embodiments, the adjustable refractive index material 1193, such as liquid crystal, may be applied uniformly as a layer on top of the dielectric etch-stop layer 1196 to fill in all the spaces and gaps between all of the multicoated rectangular metal pillars, including between paired multicoated rectangular metal pillars and between neighboring multicoated rectangular metal pillar pairs 1105. In some embodiments, the two-dimensional array of multicoated rectangular metal pillars may be uniformly distributed on the dielectric etch-stop layer 1196 with a layer of adjustable refractive index material 1193 deposited to fill the gaps therebetween. In such an embodiment, each multicoated rectangular metal pillar may be voltage-controlled to modify the refractive index of the adjustable refractive index material 1193 between itself and multiple neighboring multicoated rectangular metal pillars.

Figure 12:
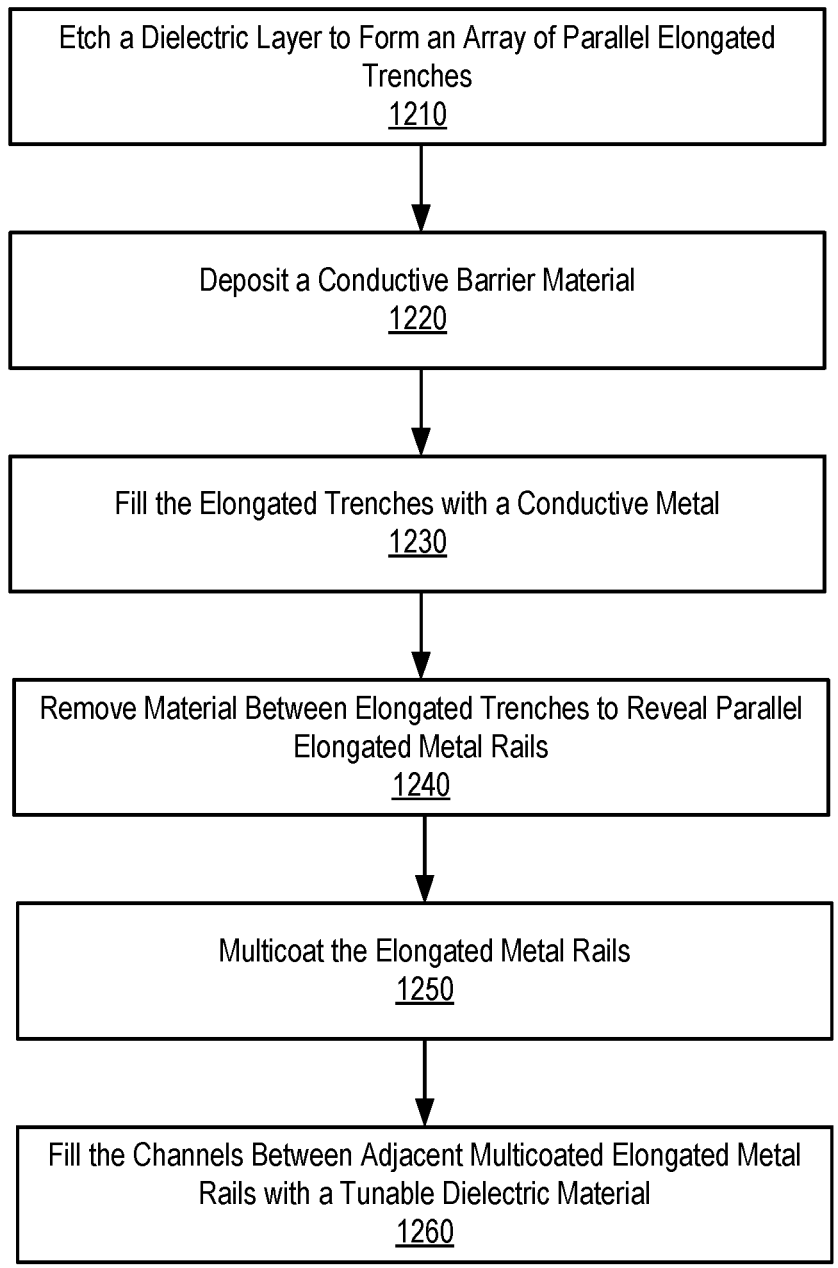
FIG. 12 illustrates a flowchart of an example method to form a tunable optical metasurface with multicoated metal rails, according to one embodiment.

FIG. 12 illustrates a flowchart of an example method to form a tunable optical metasurface with multicoated elongated metal rails, according to one embodiment. As illustrated, a dielectric layer is etched, at 1210, to form an array of parallel elongated trenches. A conductive barrier material is deposited, at 1220, to cover at least a base wall or base surface of each parallel elongated trench (but optionally, the sidewalls and surfaces outside of the trenches when a conformal deposition approach is utilized). The elongated trenches are filled, at 1230, with a conductive metal, such as copper, that will ultimately serve as the metal core of each multicoated elongated metal rail. Various approaches may be utilized to deposit the conductive metal, including the use of damascene processes, seeding layers, electroless deposition techniques, and the like.

The material between the conductive metal deposited within the elongated trenches is removed, at 1240, to reveal or expose the conductive metal deposits as a one-dimensional array of elongated metal rails (or a two-dimensional array of pillars in the context of the examples described in conjunction with FIG. 11). Each of the elongated metal rails is multicoated, at 1250, such that at least one wall of each elongated metal rail is coated with an optically reflective coating, such as silver, and at least the sidewalls and top wall of each elongated metal rail are coated with a passivation layer. The channels between adjacent multicoated elongated metal rails are filled, at 1260, with a tunable dielectric material, such as liquid crystal.

Figure 13:
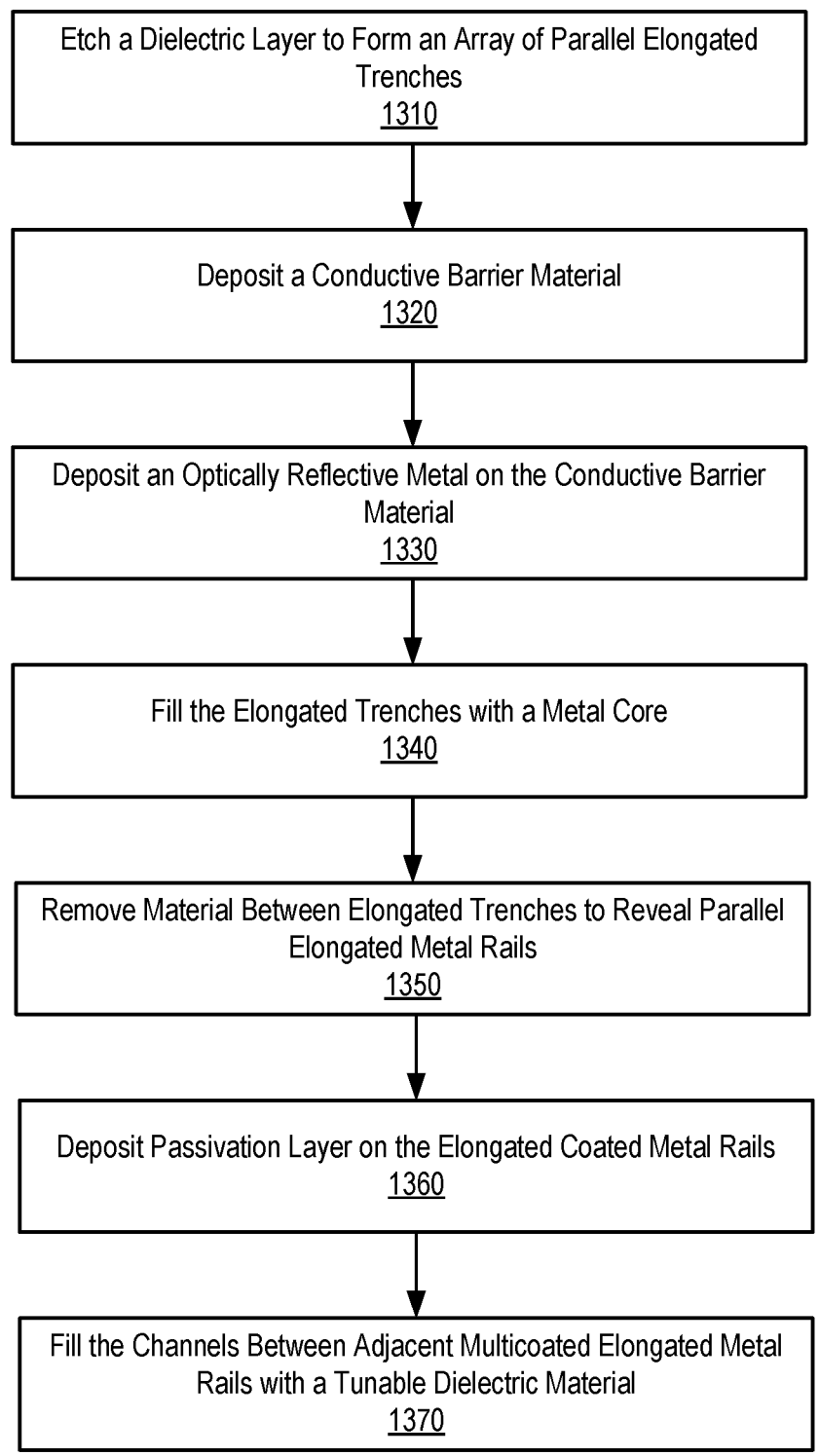
FIG. 13 illustrates a flowchart of another example method to form a tunable optical metasurface with multicoated metal rails, according to an alternative embodiment.

FIG. 13 illustrates a flowchart of another example method to form a tunable optical metasurface with multicoated elongated metal rails, according to an alternative embodiment. As illustrated, a dielectric layer is etched, at 1310, to form an array of parallel elongated trenches. A conductive barrier material is deposited, at 1320, to cover at least a base wall or base surface of each parallel elongated trench. An optically reflective metal is deposited, at 1330, within the trenches. The optically reflective metal material may be selectively deposited on only the sidewalls and bottom wall of each trench or deposited as a conformal layer that also coats surfaces outside of the trenches.

The elongated trenches are filled, at 1340, with a conductive metal, such as copper, that will ultimately serve as the metal core of each multicoated elongated metal rail. Various approaches may be utilized to deposit the conductive metal, including the use of damascene processes, seeding layers, electroless deposition techniques, and the like. The material between the elongated trenches is removed, at 1350, to reveal or expose the conductive metal deposits coated with the optically reflective metal as a one-dimensional array of single-coated elongated metal rails. Each of the single-coated elongated metal rails is coated, at 1360, with a passivation layer or deposit that covers the single-coated sidewalls of each of the elongated metal rails and the exposed top wall of each elongated metal rail. The channels between adjacent multicoated elongated metal rails are filled, at 1370, with a tunable dielectric material, such as liquid crystal.

In some embodiments, a top cap of the optically reflective metal may be applied between steps 1340 and 1350 or between steps 1350 and 1360. In such embodiments, the conductive metal core of each elongated metal rail is coated with the optically reflective metal layer on the sidewalls, bottom wall, and top wall. The passivation coating or layer is then deposited to cover (as a second coating) the sidewalls and top wall of each respective conductive metal core of each respective elongated metal rail in the one-dimensional array of multicoated elongated metal rails.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be understood to encompass at least the following claims and all possible permutations thereof.

What is claimed is:

1. A tunable optical device, comprising:
   a dielectric substrate;
   an array of multicoated metal elements extending from the dielectric substrate and spaced from one another by less than a wavelength of an operational bandwidth to form subwavelength gaps between adjacent multicoated metal elements, wherein each multicoated metal element comprises:
      a metal core having a base wall, opposing sidewalls, and a top wall;
      a first, optically reflective metal coating deposited on at least one of (i) the top wall and (ii) the sidewalls; and
      a second, passivation coating deposited on the sidewalls and the top wall;
   a conductive barrier material positioned between the base wall of each metal element and the dielectric substrate; and
   a tunable dielectric material that has a tunable refractive index positioned within the gaps between adjacent multicoated metal elements.

2. The device of claim 1, wherein the opposing sidewalls are substantially parallel to one another.

3. The device of claim 1, wherein the optically reflective metal coating is deposited on both the top wall and the sidewalls of the metal core of each respective multicoated metal element.

4. The device of claim 1, wherein the optically reflective metal coating is deposited on only the top wall of the metal core of each respective multicoated metal element.

5. The device of claim 1, wherein the optically reflective metal coating is deposited on only the sidewalls of the metal core of each respective multicoated metal element.

6. The device of claim 1, wherein the first, optically reflective metal coating is deposited on the top wall, the sidewalls, and the base wall of the metal core of each multicoated metal element, such that the metal core of each multicoated metal element is separated from the dielectric substrate by the first, optically reflective metal coating and the conductive barrier material.

7. The device of claim 1, wherein the tunable dielectric material comprises one or more of: liquid crystal, an electro-optic polymer, a chalcogenide glass, and a semiconductor material.

8. The device of claim 1, wherein the metal core of each multicoated metal element comprises copper, such that each multicoated metal element comprises a multicoated copper element.

9. The device of claim 1, wherein the conductive barrier material comprises one of tantalum (Ta), tantalum nitride (TaN), and titanium nitride (TIN).

10. The device of claim 1, wherein the optically reflective metal coating comprises a silver (Ag) metal layer with a thickness between 1 and 50 nanometers.

11. The device of claim 1, wherein the optically reflective metal coating comprises a silver (Ag) metal layer that is less than 1 nanometer thick.

12. The device of claim 1, wherein the optically reflective metal coating comprises at least one metal layer from a group of metal layers consisting of: a gold (Au) metal layer, a cobalt (Co) metal layer, and a ruthenium (Ru) metal layer.

13. The device of claim 1, wherein the passivation coating comprises a silicon nitride (SiN) layer.

14. The device of claim 1, wherein a width of each multicoated metal element is less than a smallest wavelength of the operational bandwidth, and wherein each multicoated metal element extends from the dielectric substrate to a height less than the smallest wavelength of the operational bandwidth.

15. The device of claim 1, wherein the array of multicoated metal elements comprises a two-dimensional array of multicoated metal antenna resonator elements having subwavelength widths, lengths, and heights.

16. The device of claim 1, wherein the array of multicoated metal elements comprises a one-dimensional array of multicoated elongated metal rails extending from the dielectric substrate parallel to one another and spaced from one another such that the gaps form channels between adjacent multicoated elongated metal rails.

17. A method to manufacture a tunable optical device, comprising:
   etching a dielectric layer to form an array of parallel elongated trenches in the dielectric layer, wherein each elongated trench has sidewalls separated by a base wall that has a width less than a wavelength in an operational bandwidth;
   depositing a conductive barrier material to cover at least the base wall of each elongated trench;
   filling each elongated trench with a conductive metal;
   removing material between the elongated trenches to expose the conductive metal as an array of parallel elongated metal rails with channels therebetween, wherein each elongated metal rail comprises exposed sidewalls, an exposed top wall, and a base wall separated from the dielectric layer by a region of the conductive barrier material;
   multicoating the elongated metal rails by:
      depositing a first, optically reflective metal coating on at least the exposed top wall of each elongated metal rail; and
      depositing a second, passivation coating on the sidewalls and top wall of each elongated metal rail; and
   filling the channels between adjacent multicoated elongated metal rails with a tunable dielectric material that has a tunable refractive index.

18. The method of claim 17, wherein multicoating the elongated metal rails comprises:
   depositing the optically reflective metal coating on the exposed sidewalls and the exposed top wall of each elongated metal rail; and depositing the passivation coating on the sidewalls and top wall of each elongated metal rail.

19. The method of claim 17, wherein the conductive metal comprises copper, such that the elongated metal rails comprise elongated copper rails.

20. The method of claim 17, wherein filling each of the elongated trenches with a conductive metal comprises:
   depositing a copper seed layer on at least the sidewalls and base wall of each elongated trench, and
   depositing copper to fill any remaining volume in each elongated trench using an electrochemical plating (ECP) process.

21. The method of claim 17, wherein the conductive barrier material comprises one of tantalum (Ta), tantalum nitride (TaN), and titanium nitride (TiN).

22. The method of claim 17, wherein the first, optically reflective metal coating comprises a silver (Ag) metal layer with a thickness between 1 and 50 nanometers.

23. The method of claim 22, wherein the silver metal layer is less than 30 nanometers thick.

24. The method of claim 17, wherein the optically reflective metal coating comprises at least one metal layer from a group of metal layers consisting of: a gold (Au) metal layer, a cobalt (Co) metal layer, and a ruthenium (Ru) metal layer.

25. The method of claim 17, wherein the passivation coating comprises a silicon nitride (SiN) layer.

26. The method of claim 17, wherein depositing the conductive barrier material comprises depositing a conductive barrier material that covers exposed surfaces of the dielectric layer, including surfaces between adjacent elongated trenches, the sidewalls of each of the elongated trenches, the base wall of each of the elongated trenches, and
   wherein removing material between the elongated trenches comprises removing the conductive barrier material deposited on the sidewalls of the elongated trenches and on surfaces between the elongated trenches.

27. The method of claim 17, wherein removing material between the elongated trenches to expose the conductive metal as the array of parallel elongated metal rails comprises:
   planarizing via chemical mechanical planarization (CMP) to remove deposited conductive barrier material and conductive metal between adjacent elongated trenches filled with the conductive metal, and
   wet etching the dielectric layer between the elongated trenches to expose the array of parallel elongated metal rails.

28. The method of claim 17, wherein the dielectric layer comprises multiple dielectric sublayers, wherein one of the dielectric sublayers comprises a dielectric etch-stop sublayer to control a depth to which the parallel elongated trenches are etched into the dielectric layer, and
   wherein removing material between the elongated trenches comprises etching to remove a dielectric sublayer above the dielectric etch-stop sublayer.

29. A method to manufacture a tunable optical device, comprising:
   etching a dielectric layer to form an array of parallel elongated trenches in the dielectric layer, wherein each elongated trench has sidewalls separated by a base wall that has a width less than a wavelength in an operational bandwidth;
   depositing a conductive barrier material to cover at least the base wall of each elongated trench;
   depositing an optically reflective metal on the conductive barrier material deposited on the base wall of each respective elongated trench and along the sidewalls of each elongated trench;
   filling each elongated trench with a conductive metal core, such that each conductive metal core is coated by the optically reflective metal on the base wall and sidewalls;
   removing material between the elongated trenches to expose the optically reflective metal-coated conductive metal cores as an array of elongated coated metal rails with channels therebetween, where each elongated coated metal rail is separated from the dielectric layer by a region of the conductive barrier material;
   depositing a passivation coating on the elongated coated metal rails to form an array of multicoated elongated metal rails; and
   filling the channels between adjacent multicoated elongated metal rails with a tunable dielectric material that has a tunable refractive index.

30. The method of claim 29, further comprising:
   depositing the optically reflective metal on a top wall of each conductive metal core prior to removing the material between the elongated trenches, such that each conductive metal core is coated by the optically reflective metal on the base wall, sidewalls, and the top wall.

31. A tunable optical device, comprising:
   a dielectric substrate;
   an array of multicoated elongated metal rails extending from the dielectric substrate parallel to one another and spaced from one another to form channels therebetween with channel widths less than a wavelength of an operational bandwidth, wherein each multicoated elongated metal rail comprises:
      a metal core having a base wall, opposing sidewalls, and a top wall;
      a first, optically reflective metal coating deposited on at least one of (i) the top wall and (ii) the sidewalls; and
      a second, passivation coating deposited on the sidewalls and the top wall;
   a conductive barrier material positioned between the base wall of each elongated metal rail and the dielectric substrate; and
   a tunable dielectric material that has a tunable refractive index positioned within the channels between adjacent multicoated elongated metal rails.

* * * * *